United States Patent
Andersson

(10) Patent No.: US 6,878,052 B2
(45) Date of Patent: Apr. 12, 2005

(54) METHOD AND SYSTEM FOR CONTROLLING MEAT PRODUCTS

(76) Inventor: Håkan Andersson, Bucklands, Furze Hill, Kingswood, Surrey (GB), KT20 6EP (*) Notice: Subject to any disclaimer, the term of this patent is extended or adjusted under 35 U.S.C. 154(b) by 0 days.

(21) Appl. No.: 10/262,678

(22) Filed: Sep. 30, 2002

(65) Prior Publication Data

US 2003/0062001 A1 Apr. 3, 2003

(30) Foreign Application Priority Data

Sep. 28, 2001 (SE) .............................................. 0103268

(51) Int. Cl.$^7$ ........................ A22C 18/00; A22C 21/00; A22C 25/00
(52) U.S. Cl. ...................................... 452/149; 119/712
(58) Field of Search ....................... 452/149; 119/51.02, 119/858, 712, 859; 340/573.3, 5.8, 572.8

(56) References Cited

U.S. PATENT DOCUMENTS

| | | | | |
|---|---|---|---|---|
| 4,262,632 A | * | 4/1981 | Hanton et al. | 119/51.02 |
| 4,597,495 A | * | 7/1986 | Knosby | 209/3.3 |
| 4,854,328 A | * | 8/1989 | Pollack | 600/549 |
| 5,194,036 A | * | 3/1993 | Chevalier et al. | 452/198 |
| 5,478,990 A | | 12/1995 | Montanari et al. | |
| 2002/0158765 A1 | * | 10/2002 | Pape et al. | 340/573.3 |
| 2003/0058113 A1 | * | 3/2003 | Neidig et al. | 340/573.3 |

FOREIGN PATENT DOCUMENTS

| WO | WO 99/23873 A1 | 5/1999 |
|---|---|---|
| WO | WO 99/45761 A1 | 9/1999 |
| WO | WO 00/62263 A1 | 10/2000 |
| WO | WO 01/45037 A1 | 6/2001 |

* cited by examiner

*Primary Examiner*—Charles T. Jordan
*Assistant Examiner*—Judith A. Nelson
(74) *Attorney, Agent, or Firm*—Ware, Fressola, Van der Sluys & Adolphson LLP

(57) ABSTRACT

In a method and a system wherein an animal (10) at birth is provided with at least one electronic tag (20), comprising communicating means and an identification code, the code represents a specific location in a network-connected database (60,) being updated wirelessly (50) from the tag (20) to at least one receiver (40) connected to the position determining means and a time determining means and in connection with said network, registering time—and positioning information related to the animal (10). Additional information about the animal is provided to the database (60). The registered information is utilized for authorizing at least one of slaughtering and distributing actions for the purpose of at least one of meat production, meat product manufacturing and breeding. An electronic tagging of each piece of meat cut up at the time of slaughter is performed, each additional tag comprising communication means and a code connecting to said database (60) location, registering time—and positioning information related to the meat via said receiver. When refining the meat into packaged products a scanning and removing of the tags from the cut-up pieces of meat is performed and each packaged product is subsequently provided with a replacement tag comprising communication means and a code connecting to at least one database (60) location, registering time—and positioning information related to the meat product via the receiver.

24 Claims, 8 Drawing Sheets

METHOD AND SYSTEM FOR CONTROLLING MEAT PRODUCTS

TECHNICAL FIELD

The present invention pertains to a method and a system for controlling and authenticating quality and origin of meat products by means of electronic tagging and electronic surveillance and positioning of livestock, meat and meat products via networks for data and telecommunication, position determining means, and said networks having connected database servers, in addition capable of communicating with external databases of users and authorities.

BACKGROUND ART

It is becoming more and more of an important issue for people to be informed of the origin and history of food products they are about to purchase, i.e. where do they come from, how—and under what circumstances were they fabricated. Methods and traditions for growing and refining crops and animals into food products are currently issues of great importance and interest for the population in many countries. An overall consciousness can be seen steadily growing globally regarding potential risks involved with what you eat, especially when regarding that meat products from certain parts of the world already has been subjected to contamination, perhaps due to dubious breeding methods and an overall ill-treatment of the livestock. Since such livestock also may be exported in a larger scale, both for the purpose of crossbreeding and for further processing into meat products, the problems thus risk spreading globally in an accelerating rate.

Trends like growing vegetarianism and peoples increasing alienation from meat products is therefore not an illogical consequence in the longer term, when current methods for controlling and ensuring the quality and certainty of origin of meat products as a fact are uncertain and widely mistrusted. Because of fears of an epidemic spread of livestock-related diseases, governments in many countries that import meat and livestock, are putting up strict regulations for such imports, where demands on untamperable and foolproof documentation of animal-life history are put forth as a requirement for allowing continuing with such activities.

Such documentation is currently not accomplished in a sufficiently accurate and secure manner and is mostly performed through manual recording of animal-history related information such as date and place of birth, sickness and medical related data and so forth either on paper or electronically. The registrations are often performed by the livestock-owners without an adequate control of authenticity of the recorded data and many times on a more local basis without connection to any internationally prevailing standards or requirements. Changes in the geographical whereabouts of a specific animal during its lifetime are for example often not recorded properly and ambiguous positions or positions with insufficient accuracy and reliability may be registered, causing problems e.g. when animals are moved to areas where there may be locally present diseases, which would have to be registered since symptoms of contamination of an animal could be revealed at a much later date e.g. when the animal already has been exported or slaughtered for meat. The absence of regular, complete and unambiguous location history records disables the possibilities to reliably and efficiently identify animals which has been in contact with any problem areas related to diseases, etc.

The animals are sometimes marked for identification purposes by providing a chip or strip of barcode in the ear containing a registration number. Such markings are, if not at least complemented with more permanently attached identification means, easily manipulated, e.g. by just cutting off the ear with the chip from an animal, there are suddenly no means for identification and therefore no reference to the animal-history of that particular animal. Such strips of barcode can also easily fall off leaving the animal unmarked and without a recorded life history.

Since the state of origin declared on meat products for sale also has been proven incorrect at numerous occasions, people are thus made aware of the mentioned shortcomings of current animal registration and marking methods and tend to start avoiding certain meat products due to the risk of contamination and also for ethical reasons.

Other problems originating from current methods of recording and handling animal history-data relate to the time-consuming and extensive effort of manually comparing an identified animal with its recorded history at the time of slaughter or export and also the overall insecurity of the method i.e. that so many opportunities are given for someone wanting to manipulate either the animal history records or the animal markings for the sake of concealing animal-history data that otherwise would lead to a rejection of allowing slaughtering—or exporting actions.

The requirements of storing and analysing history-records, especially concerning location, are equally needed within production and processing of meat and meat related products where contact between any animals, any pieces of meat or any products can be efficiently monitored and where significant gains in production efficiency can be obtained.

There seems to be a need for a more standardized, secure and precise method for marking and monitoring animals and for handling registered animal data for the sake of providing accurate animal life-history data as a basis for allowing export and import of livestock and meat and fabrication of meat products according to set quality regulations.

SUMMARY OF THE DISCLOSED INVENTION

The present invention relates to a method and a system for controlling and authenticating quality and origin of meat products for ensuring that the animals to be exported and/or slaughtered, subsequently becoming meat products, are free of diseases and have been bred and generally treated in a satisfactory way.

One object of the invention is to provide such a method and system, incorporating an alarm function for automatic warning of livestock, meat and meat products being in risk of contamination and/or disease. By continuously registering numerical information about the animals location and, consecutively, the location of meat, pieces of meat and meat products, database records can be compared and any direct—or near contact between an animal or a meat product with a potential problem can be detected and instantly alarmed. The location of any piece of the animal or any product potentially made from the animal can upon an alarm be almost immediately located and be prohibited from further distribution.

To achieve aims and objectives the present invention provides a method for controlling and authenticating quality and origin by means of electronic tagging, electronic surveillance and positioning of livestock, meat and meat products via networks for data and telecommunication and position determining means. The method comprises the steps of providing an animal at birth with at least one electronic tag, comprising communication means and an identification code;
  representing, through the code, a specific location in a network connected database, being updated wirelessly from the tag to at least one receiver connected to the position determining means and a time determining means and in connection with the network, registering time—and positioning information related to the animal;
  providing additional information about the animal to the database;
  authorizing out of the information at least one of slaughtering and distributing actions for the purpose of at least one of meat production, meat product manufacturing and breeding;
  scanning and replacing the tag, when the animal is slaughtered, with an electronic tagging of each piece of meat cut up at the time of slaughter, wherein each additional tag comprises communication means and a code connecting to the database location, registering time—and positioning information related to the meat via the receiver; and
  scanning and removing the tags from the cut-up pieces of meat when refining the meat into packaged products and wherein each packaged product subsequently is provided with a replacement tag comprising communication means and a code connecting to at least one database location, registering time—and positioning information related to the meat products via the receiver; and
  thus having an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

In one embodiment of the method according to the present invention, the position of the animal, meat or meat product is determined through position determining means comprised in the tag.

In another embodiment of the method according to the present invention, at least one of air and animal meat temperature is measured for the animal, meat or meat product through a temperature determining means comprised in the tag.

In yet another embodiment of the method according to the present invention, each additional tag provided at the time of slaughter has the same code as the tag provided at birth and refers to the database location for additional updating with slaughtering and production-related data.

In a further embodiment of the method according to the present invention, the code in the tag of each packaged product represents and connects to animal data in one or more locations in the database in accordance with the mixing of meat from different animals in the product.

In yet a further embodiment of the method according to the present invention, an end customer gains access to at least part of the stored animal data through a local computerized interface and via the code in the tag for self-information of the quality and origin of animals, meat and meat products for sale.

In other embodiments of the method according to the present invention, the tag is a transponder injected and fastened in the muscle or skeleton of the animal, preferably in the nape of the neck, the tag is a transponder fastened to a piece of meat or the tag is a smart label fastened to a package of meat.

In yet other embodiments of the method according to the present invention, the wireless registering of information is accomplished by transmitting data through RFID-, bluetooth-, cellular radio technology or wireless local area networks and the position determining means utilizes GPS, cellular radio technology or existing geographic databases.

In yet one embodiment of the method according to the present invention, a discontinuity in animal time- and positioning data in the database is notified and constitutes a possible hindrance for allowing distributing animals, meat or meat products to a market.

In a following embodiment of the method according to the present invention, registrations of animal positioning data in the database are numerically compared with registered positions of alarms concerning diseases, unauthorized food content or contamination, for notifications in the database constituting possible hindrances for allowing distributing animals, meat or meat products to a market if the positioning data are found matching or close to matching according to a predetermined threshold for the positioning data.

The present invention further sets forth a system for controlling and authenticating quality and origin by means of electronic tagging, electronic surveillance and positioning of livestock, meat and meat products via networks for data and telecommunication and position determining means. The system comprises:
  an electronic tag, provided to an animal at birth comprising communicating means and an identification code;
  at least one identification code receiver triggering time— and position registrations;
  a network connected database wherein a specific location is represented through the code, the database location being updated wirelessly from the tag via the receiver, registering time—and positioning information related to the animal;
  data inputting means for providing additional information about the animal to the specific database location;
  means for authorizing, out of the information, at least one of slaughtering and distributing actions for the purpose of at least one of meat production, meat product manufacturing and breeding;
  tag scanning means for scanning and replacing the tag, when the animal is slaughtered, with an electronic tagging of each piece of meat cut up at the time of slaughter, wherein each additional tag comprises communication means and a code connecting to the database location, registering time13 and positioning information related to the meat via the receiver; and scanning and removing the tags from the cut-up pieces of meat when refining the meat into packaged products and wherein each packaged product subsequently is provided with a replacement tag comprising communication means and a code connecting to at least one database location, registering time—and positioning information related to the meat products via the receiver; and
  thus having an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

In one embodiment of the system according to the present invention, the tag further comprises position determining means In another embodiment of the system according to the present invention, the tag further comprises temperature determining means.

In a further embodiment of the system according to the present invention, each additional tag provided at the time of slaughter is arranged to have the same code as the tag provided to the animal at birth and to refer to the database location for additional updating with slaughtering and production-related data.

In yet one embodiment of the system according to the present invention, the code in the tag of each packaged product represents and connects to animal data in one or more locations in the database in accordance with the mixing of meat from different animals in the product.

In yet another embodiment of the system according to the present invention, an end customer through a local computerized interface and via the code in the tag have means for accessing at least part of the stored animal data for self-informing of the quality and origin of animals, meat and meat products for sale.

In other embodiments of the system according to the present invention, the tag is a transponder arranged to be injected and fastened in the muscle or skeleton of the animal, preferably in the nape of the neck, the tag is a transponder arranged to be fastened to a piece of meat or the tag is a smart label arranged to be fastened to a package of meat.

In yet other embodiments of the system according to the present invention, the wireless registering of information is arranged to be accomplished through RFID-, bluetooth, cellular radio technology or wireless local area networks and the position determining means is arranged to utilize GPS, cellular radio technology or existing geographic databases.

In yet a further embodiment of the system according to the present invention, absent or discontinuous registrations of time—and positioning data in the database is notified and arranged to constitute a hindrance for allowing distributing animals, meat and meat products to a market.

In a following embodiment of the system according to the present invention, registrations of animal positioning data in the database are arranged to be numerically compared with registered positions of alarms concerning diseases, unauthorized food content, contamination, or the like, for notifications in the database constituting possible hindrances for allowing distributing animals, meat or meat products to a market if the positioning data are found matching or close to matching according to a predetermined threshold for the positioning data.

BRIEF DESCRIPTION OF THE DRAWINGS

Henceforth reference is had to the attached figures for a better understanding of the present invention and its examples and embodiments, wherein the.

WORDLIST

Figure 1:
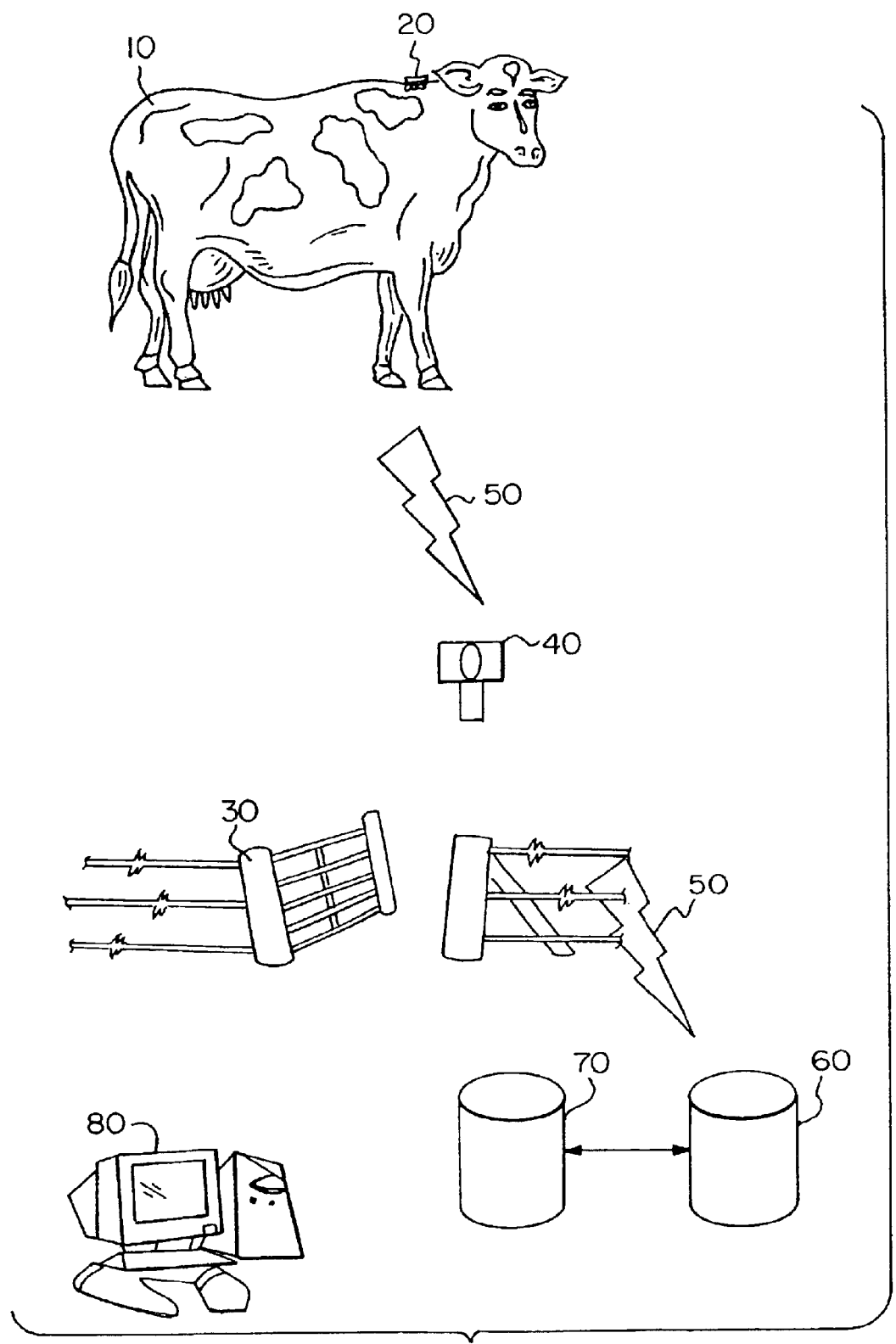
FIG. 1 schematically illustrates a monitoring and data collecting of a tagged animal according to one embodiment of the present invention.

RFID (Radio Frequency IDentification) is a data collection technology that uses electronic tags to store identification data and a wireless transmission method to capture the data.

A handheld computerized device can be a laptop computer, a PDA or the like comprising cellular radio equipment, a WAP telephone device etc.

WAP (Wireless Application Protocol) enables a WWW connection through a cellular telephone.

An open network for data communication can be the WWW or other like open networks, Intranet etc.

A PDA (Personal Digital Assistant) is a handheld computer that serves as an organizer for personal information.

SMS (Short Message Service) is a text message service that enables short messages of generally no more than 140–160 characters in length to be sent and transmitted to and from a device for mobile communication, like a cellular telephone.

GSM (Global System for Mobile Communications) is a digital cellular phone technology, which can be utilized for telecommunication and positioning purposes. Similar technologies fulfilling the same purposes are for example D-AMPS, CDMA and UMTS.

GPS (Global Positioning System) is a system of 24 satellites for identifying earth locations. By triangulation of signals from three or more of the satellites, a receiving unit can pinpoint its current location anywhere on earth to within a few meters. Similar technologies fulfilling the same purposes are the Russian GLONASS system and the forthcoming European Galileo systems.

DETAILED DESCRIPTION OF PREFERRED EMBODIMENTS

The present invention sets forth a method and a system for controlling and authenticating quality and origin of livestock, meat and meat products both for the sake of allowing animal and meat product distribution, exporting and importing activities and for providing an end customer with a means for self-informing of the origin and history of animals, meat and meat products for sale on a market or in a store. The animal, and subsequent meat products, are monitored in an unbroken historical chain, including transportations, based on unambiguous numerical position records, enabling automatic analysis and detection of any encounters or close-encounters with problems, such as diseases, contaminations and the like, directly from the database records.

A system according to a preferred embodiment of the present invention comprises an electronic tag 20, provided to an animal 10 at birth comprising communicating means and an identification code. Included in the system is also at least one identification code receiver 40 triggering time— and position registrations and a network connected database 60 wherein a specific location is represented through the code. The database location is updated wirelessly from the tag 20 via the receiver 40, registering time—and positioning information related to the animal 10. The system further comprises data inputting means for providing additional information about the animal to the specific database location and means for authorizing, out of the information, at least one of slaughtering and distributing actions for the purpose of at least one of meat production, meat product manufacturing and breeding. Incorporated in the system is also tag scanning means for scanning and replacing the tag, when the animal is slaughtered, with an electronic tagging of each piece of meat cut up at the time of slaughter, and each additional tag comprises communication means and a code connecting to the database location, registering time—and positioning information related to the meat via the receiver. The additional tags are then via system-included scanning means scanned and removed from the cut-up pieces of meat when refining the meat into packaged products and each packaged product is subsequently provided with a replacement tag comprising communication means and a code connecting to at least one database location, registering time—and positioning information related to the meat products via the receiver. The system according to the preferred embodiment of the invention thus achieving an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

FIG. 1, in one embodiment of the present invention, illustrates how different animal-related events can be monitored and registered throughout the length of an animal's 10 life by means of at least one electronic tagging 20, performed on the animal 10 when newly born. Animal life-history data, including numerical positions, such as e.g. information on date and place of birth and death, breeding- and feeding-info, information on current and past ownership, genealogical-info, medical—and sickness-info, transporting-info and slaughtering-info, can be continuously registered and updated, e.g. by authorized personnel such as certified veterinaries or controllers, via wireless communication 50 and networks for data and telecommunication, said networks having connected database servers 60, wherein the data is stored in a specific location correlating to an animal-unique identification code in the tag 20 of each tagged animal 10.

According to an embodiment of the invention, database servers 60 are communicating with external databases 70 for collecting data from the external databases, such as official registration data, and providing data for the external databases 70, such as production databases and retailer databases, seamlessly and data format independent.

The animal's 10 geographical positioning can be electronically monitored and automatically registered, either continuously at predetermined time intervals, when the position of the animal 10 has changed more than a predetermined set distance from an originally defined geographical area, or when the animal is passing through positioned entry and exits gates, via positioning and communication means in the animal tagging by RFID, GPS or GSM or other similar technologies.

In order to be able to monitor and keep track of both stationary animals as well as of animals being transported, according to one embodiment of the present invention, powerful position coordinate receivers 40, e.g. comprising GPS receivers, RFID-antennas or the like means for communicating position coordinates wirelessly 50 from the animal tags to the specific locations in the network of databases 60, are provided around the vicinity of the animals e.g. in the farmhouse indoors and on the fencing of the animal enclosure 30 outdoors. Additional receivers are furthermore provided in the possible transporting means, e.g. the truck, ship, train or such may be connected to the navigation system and/or fleet management system of the transport vehicle and also at and around the destination location of the animals, thus providing an uninterrupted monitoring and registering of an animal's positions also during relocation. Authorized personnel can alternatively also manually register the changing of location of tagged animals e.g. in cases where the recording due to some reason does not function. During the meat-based production, after the slaughter, position co-ordinates are obtained at all positions where tags are read, keeping the location-history records unbroken throughout the production.

A notification, warning, is automatically registered in the database in case of missing or discontinuous position coordinate registrations, indicating that one or more animals have been relocated without due control and surveillance and this provides a reason for e.g. rejecting exporting actions as well as slaughtering actions for the purpose of using the meat in production. An inspector e.g. at a border control or at a slaughtering facility can, through database access via the unique identification code in the animal tag and via a local computerized interface, e.g. a PDA, a laptop or stationary computer, a cellular telephone with WAP capability or the like handheld or stationary computerized means for connection with a network of databases, directly check on the status of a particular animal for allowing or rejecting that animal. A manually input position registration performed by authorized personnel and covering the missing registrations can also withdraw the previously registered warning, which then won't constitute a future hindrance for export or fabrication of meat products.

Positional records, in the form of numerical co-ordinates can, in case of any problems or alarms concerning diseases, unauthorized food content, contamination, etc. be cross checked automatically, through numerical methods, by comparing the position records of animals and products with the position of the problem object or area. A safety zone of selected size or form surrounding the problem object can be used for identification of animals and food products being in risk of having been in contact with the problem. Animals or food products susceptible of having been in contact with a problem or problem area can be noted in the database for the purpose of rejection of further actions, like slaughter, transport, distribution, export, etc.

The utilisation of database records for logging the activities concerning animals, meat and meat products are in itself a large progress concerning traceability and verification of their origin. In addition to this, the present invention is based on the obligatory inclusion of numerical and unambiguous position records in all phases of the animal life, as well as in the production and distribution of meat and meat products—in combination with the recording of events and movements—and including the logging of the original source of each data record. The availability of historical position records further enhances the traceability and verifiability of the origin of the products in all steps, and gives all involved parties additional and significant advantages as compared to database records being without complete unambiguous numerical positions.

According to one embodiment of the present invention, the tag can be a transponder, smart label, code plate or the like means for electronic marking and can for example have a unique identification number sequence stored in a chip, which number sequence can be sent directly to the network of databases through GSM-technology, or other wireless telecommunication technologies, over an open network for data communication like the internet or through an antenna system in connection with a handheld or stationary reader, whereby the reader communicates with the chip and sends out a protocol wirelessly via the antenna system to the network of connected databases for interpretation by software therein, which extracts and communicates the unique identification number sequence corresponding to a specific location in a database and allows entering of the animal-history data when an authorization code, centrally provided to authorised system managers e.g. certified veterinaries, controllers or the like authorized personnel, has been entered and accepted by authorization software in the system. Such authorization of system managers can e.g. be performed on a governmental— or the like higher official level for security reasons and according to nationally and/or internationally prevailing standards, regulations or requirements.

The actual marking of newly born animals can, in one embodiment of the present invention, be performed by authorized personnel e.g. certified veterinaries, controllers injecting the tag, such as a transponder or the like, into the muscle or skeleton of the animal for example in the nape of the neck. Thus providing an electronic marking, which is well hidden and difficult to remove for manipulating purposes. When an animal 10 is detected by a receiver 40, for example through the electronic tagging 20 communicating with the receiver 40 wirelessly 50, the unique code in the tag 20 is wirelessly read and communicated 50 via GPS-, RFID- or cellular radio-technology as for example GSM, or by suitable electromagnetic radiation such as RF or the like for automatic position registration in the network of databases 60. The time and date is correspondingly registered for each position registration in the database 60 for following an animal's 10 different positioning in time. The time—and position registrations can alternatively be performed continuously in time providing real-time positioning information of the animal 10. The identification code receiver also has data transmitting capabilities for handling forwarding the time—and positioning data to the database for storage in a database location in accordance with the identification code attached to the transmitted data.

For manually entering animal-data, a handheld receiver can be used for reading the code in the tag or the identification code can be input manually and can, together with a system authorization code, give access to authorized entering of additional data such as history data for a particular animal into the database. The data can then e.g. be manually input over an open network for data communication like the Internet through a portable or stationary computer, PDA or cellular phone with WAP, or other mobile Internet, capabilities or communicated via voice instructions or SMS through a network for telecommunication like the GSM to a centrally located authorized system manager, who in turn manually inputs the communicated data into the database. Data of different authorisation levels may be allowed to be stored in the network of databases 60 by marking the data with the origin and authorisation level of the data. At export to external databases 70, the authorization of the data will always be verified.

The database-stored animal data can then also be checked by utilizing a reader communicating the code to the system or by manually inputting the identification code according to the above mentioned steps, for example by an inspector at customs control and according to requirements set by a predetermined standard for allowing exporting or importing animals or meat, or at a slaughtering, cutting or sausage facility, according to requirements set by a predetermined standard for distributing meat products to a market, for allowing fabrication of meat products or alternatively by a person wanting to purchase a tagged animal, wanting to secure the quality and origin of that particular animal, for example for the sake of breeding.

After approval by an inspector, or other authorised person, at a slaughtering facility, when cutting up pieces of an animal 10 for meat production, each piece of meat originating from one tagged 20 animal 10 is provided with additional tags comprising the same unique code or a replacement code referring to the same database location 60 and additional slaughtering data can be entered into the system by an authorized controller or by production personnel given authorisation to enter such data. The scanning and replacement of tags during the slaughtering and meat cutting process may be performed in more than one step. In this way, individual pieces of meat can be checked according to the steps mentioned above for animal history data regardless of the future location of the different pieces of meat originating from that animal 10, for example when the time comes for further refining such pieces of meat into packaged products. In connection with the further refining of the tagged pieces of meat into different products, the tags are removed from the meat and each packaged product is subsequently provided with an electronic replacement tagging or marking comprising at least one code corresponding to the meat content of the product and representing animal history data in one or more locations in the database 60 depending on the mixing of meatfrom different animals in the product.

Time—and positioning information is continuously being provided to the database from the replacement tags arranged to the pieces of meat at the time of slaughter and to the meat products after packaging, via receivers being connected to position determining means and time determining means and in connection with the network of connected databases, and being strategically positioned in the vicinity of the meat and meat products.

In one embodiment of the present invention such replacement markings can for example be smart labels having a chip mounted inside with RFID technology and a memory function, for storing data in different memory blocks and into which authorized personnel can copy chosen animal data from the database 60 for end customer information purposes and upon which label it is possible to write with printers. The data, thus stored directly on a package of meat, can then easily be read from the smart label by a handheld or stationary reader connected to an antenna, as described in steps above, for example by a customer in a market place wanting information of the quality and origin of the meat, and there can also be a connection to a computer system or a network. The animal history data can then for example be presented on the screen of a computerized interface 80. The electronic replacement marking on a packaged product can alternatively be provided with one or more of the identification codes from the original animal taggings provided at birth or with a replacement code in accordance with the meat content of the product and enabling connection to all or predetermined parts of the database 60 stored animal data through the codes and for example via a computerized interface 80 in a marketplace and on an electronic screen informing an end customer of the quality and origin of the meat. The possibility to write with printers on the outside or surface of a smart label makes it furthermore useful for product information to customers with, e.g. bar code for storage, producer logotype, price and so forth.

According to one embodiment of the present invention, the farmers are able to obtain information instantly on the actual location of all animals, preferably using a graphical map display being connected to the network for retrieving the therein-stored positional data of the relevant animals. In case of problems, related to diseases, contamination, or the like, the farmers can numerically search for all animals having been in the vicinity of the problem, in a definable space and time, by automatic numerical standard methods used within areas such as Geodesy and Geoinformatics. This includes problems on their own farm, as well as on other farms and facilities, where the animal has been located previously. In case of any problems detected later during the food production the corresponding search can be made, for example by the meat production industries in order to locate other animals, which are in risk of being affected.

Medical record data shall, in one embodiment of the invention, be added directly at the time of the medicinal activity, by an authorised veterinary or by the farmer or other person given authorisation by the veterinary. The positional information of the medical record then can be matched with other computerised or not computerised records such as the veterinary doctor's agenda and other activities of the farmers for post verification.

In a further embodiment of the invention, sales transactions can be automatically reported and verified by the positional records of the animal movements in connection to the transport between two farmers facilities or from a farmer to a slaughter house, reducing administrative cost and improving the security further of the transaction. Information concerning an animal or group of animals can be accessed in connection to auctions and other sales activities and give immediate confirmation on all physical locations an animal or a group of animals have been at during its previous life in addition to other animal data.

A further embodiment of the invention accomplishes that in connection to transports within a farm, between farms and between farms and the slaughter facilities (abattoirs), the positions are acquired through independent storage devises, such as GPS, or by connecting directly to existing and verified car navigation and fleet management tools of the transport company. Through the complete, numerical and unambiguous positioning records any contacts with diseases, contaminated material or the like, can be automatically and numerically identified in real time. This includes also just passing through an area with a transport, for detection of possible contact with, for instance, airborne and highly contaminant diseases such as the foot and mouth disease. The obligatory use of positioning also during transport concerning animal, meat and meat products additionally gives logistical advantages such as possibilities of precise pre-delivery announcements and improved production and distribution planning.

During a slaughter and cutting process it is necessary to replace animals identification tags, whether they are electronic devices or just barcode or text tags. This opens the possibility of frauds or mistakes concerning the origin of the meat and meat products unless positioning records are used. Through the availability of continuous and complete, unambiguous, numerical positioning records as of the method and system according to the present invention, the meat and meat products can be automatically and numerically checked for continuity in time and position, independent of production environment, eliminating the possibilities of frauds and errors during cutting and meat production.

In meat related production, such as for manufacturing sausages, the identity of the individual pieces of meats, according to one embodiment of the present invention, are replaced by the identity of transport containers or batches. By continuously storing not only the identities, actions and time of each event, but also the numerical unambiguous positions of each container at each time, any frauds or mistakes concerning the content, age of the content, or the like can similarly be detected by automatic numerical analysis of the positional records, based on pre-defined acceptance criteria.

The use of identity devices on meat and meat products gives the retailers and the end customers complete access to the origin of the meat. The use of obligatory and complete positioning records additionally gives the retailers and the end customers the possibility to personally verify the origin of the animal and meat product answering questions on all locations the animals have been at or passed by as well as times and positions during the production flow, resulting in a market driven product verification process in complement to the rules set up by authorities.

In the following, a prior art production flow is described, from the birth of the animals to ready sausages, and overall for production of meat products, as currently is the situation at many facilities. Embodiments according to the present invention are implemented and further described in the form of electronic tagging and surveillance in each production step in such a way that the production methodology is more or less unchanged.

Prior Art Production Flow from Birth to Slaughter for Cattle

Calves can be of breeds used for milk production or for meat production. Depending on in which environment they are brought up, some of the cow-calves are selected for milk production while practically all bull-calves are bred for meat production. Within their first days the calves are marked with ear tags, one on each ear for the official registration and usually, over time, some more ear tags for identification of the breeders and raisers. The calves intended for meat production are initially raised on the farm of birth and are, at an age of around 3 months, sold and transferred to another farm specialised in breeding the animals until slaughter. Sales of the animals are administrated through farmer related organisations and slaughter houses and are reported by e-mail and fax by the seller (the procedure is somehow administrative heavy and external consultants are assisting the farmers for a fee).

At arrival the calves are given some medication against diseases and insects, which shall be noted for each individual. They are feed indoors for 3–4 months, later transferred for outdoor-raising for a similar time and finally they are spending the last 3–4 months indoor. In addition to the regular inspections and vaccinations by veterinarians they are inspected daily by the farmer. Based on the individual needs, and upon agreement with the veterinarians, the animals are given medication or other treatments directly by the farmer. The farmers are obliged to report any medical care to the authorities (another step that needs administrative paperwork) on an individual level. The animals are recognised by the identity number of the ear tags and may sometimes be temporarily marked by colours to be easy to locate on a daily basis.

They are individually selected, based on weight or visual inspection of body constitution, for slaughter and sent consecutively, group wise, for slaughter and are loaded on transports to the slaughter facility (abattoir). The reporting has also in this case to be done by the farmer selling the animal for slaughter. After some days the farmer gets the information on weight, quality and payment of the animals from the slaughter facility via a WEB-site.

Figure 2:
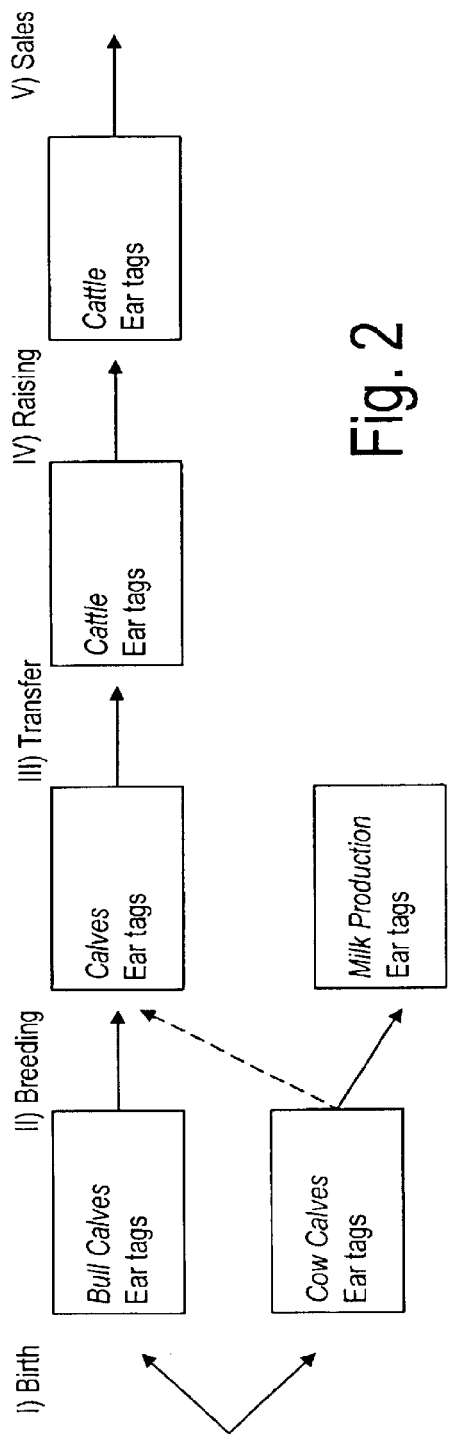
FIG. 2 schematically illustrates operations related to electronic identity and databases for the production flow of cattle from birth until slaughter according to one embodiment of the present invention.

In an implementation of the method and system according to one embodiment of the present invention, the following operations related to electronic identity and databases can be performed, as depicted in the flowchart of FIG. 2 denoted with roman reference numerals, for the production flow of cattle from birth until slaughter.

I) Birth
  a) The RFID device is injected into the animal in direct relation to the birth. The animal-identity is registered. Breeding information and other ancillary data is stored in the database. For practical reasons, related to obtainable reading distance, the injected RFID device may be complemented by an ear tag containing a separate RFID device bearing the same connection to the animal-identity and the records in the database.

II) Breeding
  (Breeding and raising of the calves during the first months).
  b) Cow-calves for milk production are separated and the corresponding information is added to the database.
  c) Data is stored in the database in direct connection to any regular or special treatment for logging, for example time, position, disease, treatment, weight, etc.
  d) The animal-identity is registered with a reading device in connection to any transfer between facilities at the farm or externally, for example by reading devices in the entrances and exits.

III) Transfer
  (Sales of the animal between the farms and physical transport of the calves to the farm raising the animals until slaughter. Sales transactions are based directly or indirectly on the information and logging of activities in the database).
  e) The animal-identity is registered with a reading device at the entrance to the transport.
  f) Positions, time and animal-identities are registered continuously during the transport at fixed time intervals, distances or at break-points.
  g) The animal-identity is registered with a reading device at the exit of the transport.
  h) The sales transaction is performed automatically, with a digital confirmation from the buyer.
  i) Data is stored in the database, for example times, positions, vehicle id, seller buyer etc.
  j) Data can be retrieved by the seller and the buyer from the database.

IV) Raising
  (The raising of the calves until time of slaughter).
  k) Data is stored in the database in direct connection to any regular or special treatment for logging, for example time, position, disease, treatment, weight, etc.
  l) The animal-identity may be registered with a reading device in connection to any transfer between facilities at the farm or externally by reading devices in the entrances and exits.

V) Sales
  (Transport of the calves to the slaughter facility, sales and payment of the meat).
  m) The animal-identity is registered with a reading device at the entrance to the transport.
  n) Positions, time and animal-identities are registered continuously during the transport at fixed time intervals, distances or at break-points.
  o) The identity is registered with a reading device at the exit of the transport.
  p) The sales transaction is performed automatically, with a digital confirmation from the buyer.
  q) Data is stored in the database (such as times, positions, vehicle id, seller, buyer etc.).
  r) The seller can retrieve data from the database after slaughter, cutting, etc.

At any point in the procedure relevant data may be uploaded from the active database to an external database, such as databases keeping the official records of the animals on a regional, national or international level.

Prior Art Production Flow from Birth to Slaughter for Pigs

Pigs are born and raised for the first weeks by more or less specialised nurseries. They are tattooed, during the first days of living, with the identity of the breeder, giving special treatment and nutrition. The male piglets are usually castrated. After around three weeks they are sold to farmers specialised in raising the pigs until slaughter (which takes around 6 months). They are transported to the new farm and put in boxes in groups of 6–8 animals, which are kept together for all the time. Practically all feeding is automatic. Individuals with any kind of diseases and/or other problems are put in separate boxes. Any other individuals in need of special attention must be marked with colours or similar, in order to be possible to locate. In connection to transporting to the slaughter facility (abattoir) the pigs are tattooed with the number of the farm.

Figure 3:
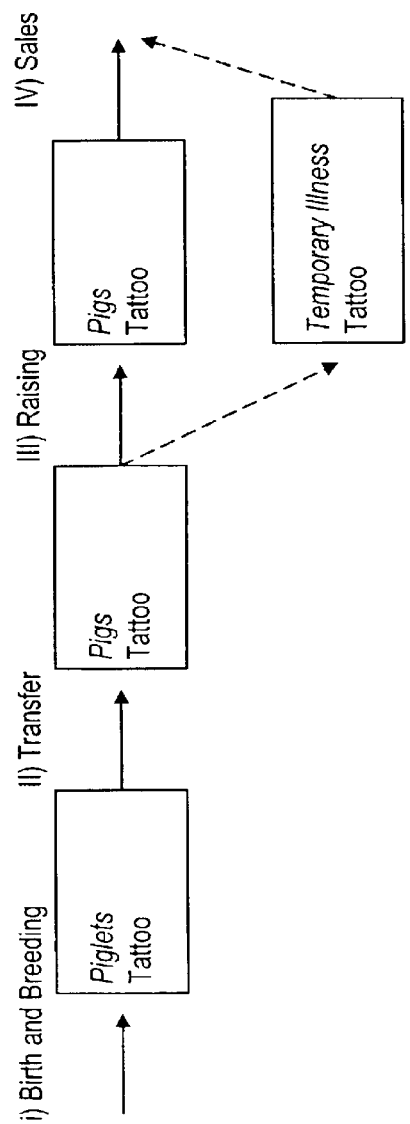
FIG. 3 schematically illustrates operations related to electronic identity and databases for the production flow of pigs from birth until slaughter according to one embodiment of the present invention.

In an implementation of the method and system according to an embodiment of the present invention, the following operations related to electronic identity and databases can be performed, as schematically depicted in the flowchart of FIG. 3 denoted with roman reference numerals, for the production flow of pigs from birth until slaughter.

I) Birth
  (The piglets are born and initially raised together with their sow for about three weeks after which they are sold and transferred).
  a) The RFID device is injected in direct relation to the birth. The animal-identity is registered. Breeding and other ancillary data is stored in the database.

b) Data is stored in the database in direct connection to any regular or special treatment for logging, for example time, position, disease, treatment, weight, castration, etc.).

c) The animal-identity can be registered with a reading device in connection to any transfer between facilities at the farm or externally by reading devices in the entrances and exits.

II) Transfer (Sales of the animal between the farms and physical transport of the piglets to the farm raising the animals until slaughter. Sales transactions are based directly or indirectly on the logging of activities in the database).

d) The animal-identity is registered with a reading device at the entrance to the transport.

e) Positions, time and animal-identities are registered continuously during the transport at fixed time intervals, distances or at break-points f) The animal-identity is registered with a reading device at the exit of the transport.

g) The sales transaction is performed automatically, with a digital confirmation from the buyer.

h) Data is stored in the database (such as times, positions, vehicle-ID, seller, buyer, etc).

i) Data is retrieved by the buyer from the database.

III) Raising (The raising of the pigs until time of slaughter).

j) Data is stored in the database in direct connection to any regular or special treatment for logging, for example time, position, treatment, weight, etc.).

k) The animal-identity may be registered with a reading device in connection to any transfer between facilities at the farm or externally by reading devices in the entrances and exits.

IV) Sales (Transport of the pigs to the slaughter facility, sales and payment of the meat).

l) The animal-identity is registered with a reading device at the entrance to the transport.

s) Positions, time and animal-identities are registered continuously during the transport at fixed time intervals, distances or at break-points.

m) The animal-identity is registered with a reading device at the exit of the transport.

n) The sales transaction is performed automatically, with a digital confirmation from the buyer.

o) Data is stored in the database (such as times, positions, vehicle-ID, seller buyer, etc.).

p) Data is retrieved by the seller from the database, after slaughter, cutting, etc.

At any point in the procedure relevant data may be uploaded from the active database to an external database, such as databases keeping the official records of the animals on a regional, national or international level.

Examples of RFID Tag Requisites for Farming Implementation

Alternative A, (tags that can be implanted)

The tags can be implanted by veterinary doctors or farmers, for instance into the muscles in the neck of the animals.

The tags can either be readable at short range (some decimetres) or at longer range, 3–4 meters. If, in the latter case, internal power is used the life length in one case is at least 6 months and in another case at least 30 month.

Only ID is required.

Preferably world unique id numbers are employed.

The tags are readable with commercially available equipment.

The tags are compatible with any existing standard.

Alternative B, (Ear tags)

The readable tags can be integrated in existing ear plastic tags.

The tags are readable at a range of at least 3 meters.

Only ID is required.

Preferably world unique id numbers are employed.

The tags are readable with commercially available equipment.

The tags have very high capabilities to withstand the tough conditions.

Examples of Tag Reading System Requisites for Farming Implementation

Alternative A, (fixed systems)

Reading of identity from one or both of the alternatives a) and b) of RFID tags for farming.

Antenna systems capable to tune into a "curtain" with about 3–4 meters range and about 2–3 meters width.

Reading system capable of being transformed for using multiple tag technologies, multiple frequencies.

Local data storage is available in case of any problems with local transmission.

On-line connection to a GSM-module for forward transmission of information (other cellular radio technologies or WLAN solutions may also be used).

Anti-collision for at least one hundred of simultaneous readings.

Reading and storage of data can be limited to the ID solely. For transmission also the ID of the reading station is included.

Rugged for (a) humid indoor environments with temperatures ranging from about +/−0 to +30 degrees Celsius, (b) outdoor environments for temperatures between −30 to +40 degrees Celsius and functional during rain, wet snow and dry snow.

Alternative B, (hand-held system)

Hand-held integrated reading device including antenna, storage and transmission capabilities.

Reading range is some decimetres.

Preferably including GPS, or possible to integrate with GPS.

In addition to tag ID, the following information can be stored and transmitted; (a) ID of operator confirmed by a pin-code, (b) action as entered in via a keyboard or similar, (c) ID of equipment, (d) location.

Reading system capable of being transformed for using multiple tag technologies, multiple frequencies.

Local data storage available.

Uploading to database via connection to Internet through mobile or fixed devices. No requirement on permanent on-line connection, for instance automatic uploading in connection to charging is possible.

Read one tag at the time only.

Tamper-proof.

Rugged for indoor and outdoor environments for temperatures ranging between −30 to +40 degrees Celsius and functional during rain, wet snow and dry snow.

Battery capacity for at least one days work.

Alternative C, (animal transport)
As alternative A but:
Possible to attach on the gate of an animal transport lorry.
Possible to integrate with either a dynamic GPS receiver or the navigation system of the vehicle.
Anti-collision for tens of simultaneous readings.
Reading, storage and transmission of data including RFID, position, and vehicle ID.

Prior Art Flow of Production from Slaughter to Primal Cuts for Cattle

At arrival to the slaughter facility (abattoir) the cattle's are carrying numbered ear tags. Each number corresponds to a record in the central database at the national agriculture authority. The database can be downloaded and accessed externally. An animal that have any problems with the ear tag (such as a lost tag, different tags on the ears, tags not corresponding to the right breeder, or even country of origin, etc) is taken aside and the farmer gets 24 hours to correct the problem properly, if not the animal will be killed and destructed. The ear tags are removed in direct connection to the slaughter and later destructed. The number is entered, manually, and the corresponding database record is collected up from the database. A new barcode based label is printed and attached to the body, replacing the ear tag. Some text information is directly available on the barcode label.

After the animal has been slaughtered, unloaded, bled and hung on a rail system the barcode is reread and the carcass is cut into quarters. New barcode labels are printed for each quarter. The quarters are quality classified through visual inspection. Automatic classification methods are very tricky concerning beef, under for instance Swedish circumstances, as the cattle is very heterogeneous ranging from milk cows to different breeds for meet production. At the next station the 4 quarters are divided into primal and sub-primal cuts—about two for each fore quarter and eight for each hind quarter—and a new set of labels are attached to each piece before packaging. Secondary pieces of meat are classified into two-three classes for production of ground meat and processed meat products and are time labelled, i.e. only an approximate identity is maintained.

(An alternative approach used by smaller abattoirs is to keep all cuts from an animal, or quarter of animal, together after the primal cutting. However this requires approximately a doubled physical space for the activities due to the high number of boxes used.)

Primal and sub primal cuts are vacuum-packed with labels both inside and outside the plastic cover. They are put into boxes and delivered to the shops via a computerised and robotised distribution system. The total meat production of an animal can be retrieved from the databases and thus becomes the bases for payments.

Figure 4:
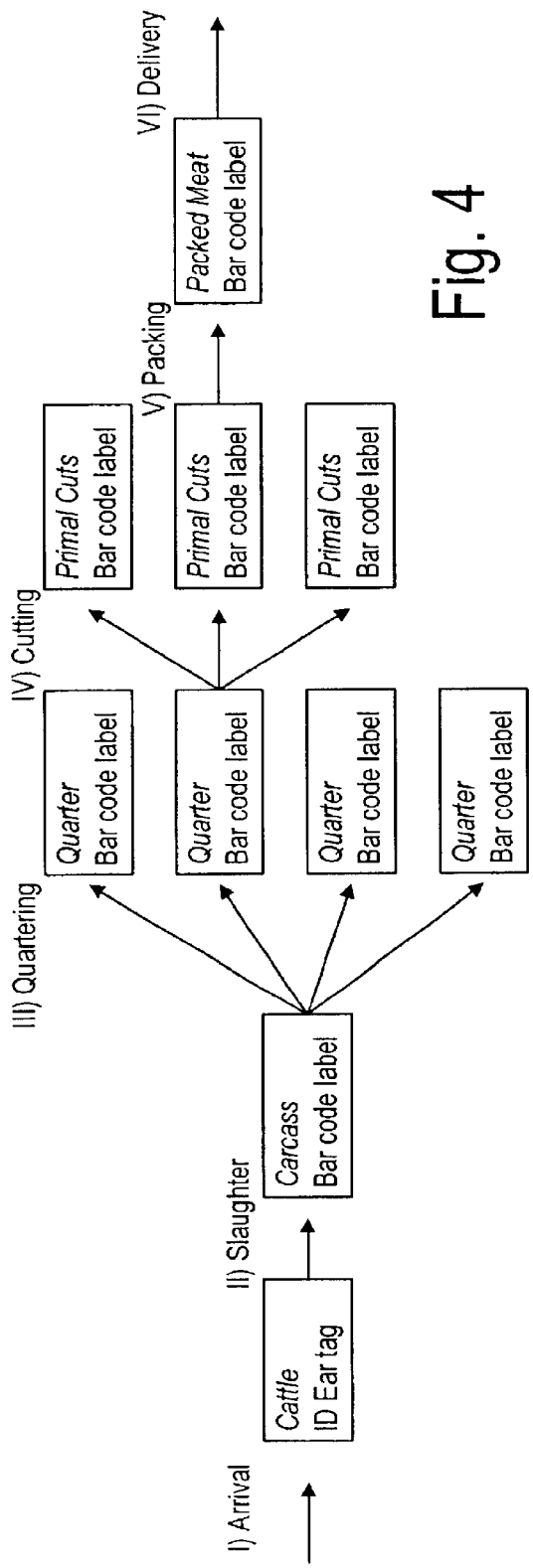
FIG. 4 schematically illustrates operations related to electronic identity and databases for the production flow of cattle from slaughter to primal cuts, packaging and delivery according to one embodiment of the present invention.

In an implementation of the method and system, according to one embodiment of the present invention, the following operations related to electronic identity and databases can be performed, as schematically depicted in the flowchart of FIG. 4 denoted with roman reference numerals, for the production flow of cattle from slaughter to primal cuts, packaging and delivery.

I) Arrival (The cattle arrive and are transferred to a temporary stable).

a) Positions, time and animal-identities are registered continuously during the transport at fixed time intervals, distances or at break-points.

b) The animal-identity is registered with a reading device at the exit of the transport.

c) The animal-identity is registered with a reading device at the entrance of the slaughter facility.

d) Any external data, such as from official records kept by regional, national or international authorities, is downloaded to the active database.

II) Slaughter (The cattle are moved from the temporary stable to the killing box, killed and hanged on transport system).

e) The animal-identity is registered with a reading device in direct connection to the slaughter, for example in connection to the gate of the killing box.

f) Data on the cattle is checked right before the killing.

g) The body is hanged on a rail system and a new RFID device is attached to the carcass after slaughter, unloading and bleeding.

h) The new RFID device is connected to the animal-identity and its database records.

i) New data is added to the database (such as time, position, hot body weight, and new and replaced RFID devices).

III) Quartering (The carcass is moved along the transport system to the quartering station, where it is quartered, quality classified and reloaded on a transport system).

j) The animal-identity is registered with a reading device right before the quartering.

k) New RFID devices are attached to each quarter.

l) The new RFID device is connected to the animal-identity and its database records.

m) New data is added to the database (such as time, position, quality, weight of the quarters, and new and replaced RFID devices).

IV) Cutting (The quarters are moved along the transport system to the cutting station and are cut into primal and sub-primal cuts).

n) The animal-identity is registered with a reading device right before the cutting.

o) New RFID devices are attached to each cut.

p) The new RFID device is connected to the animal-identity and its database records.

q) Sales and payment transactions are performed based on the value of the cuts according to the database.

r) New data is added to the database (such as time, position and weight of the primal and sub-primal cuts, and new and replaced RFID devices).

V) Packing (The cuts are packaged, sorted into boxes and stored in storage rooms).

s) The identities of the individual cuts are registered with a reading device in connection to the packing.

t) New RFID devices are attached to each box, possibly being smart tags also having data storage capacity.

u) The new RFID device is connected to the animal-identity and its database records.

v) The identity of the boxes is registered with a reading device when passing between and into storage departments.

w) New data is stored in the database, and if applicable also in the smart tags (such as time, position, content and weight of boxes and new and replaced RFID devices), VI) Delivery (The boxes are picked out of the storage and loaded on the trucks for delivery to the destination).

x) The identity is registered with a reading device at the exit of the storage facility:
  y) The identity is registered with a reading device at the loading of the transport.
  z) Positions, time and identities are registered continuously during the transport at fixed time intervals, distances or at break-points.
  aa) The identity is registered with a reading device at the unloading of the transport.
  bb) The identity is registered with a reading device at the entrance to the wholesaler or retailer facility.
  cc) The sales transaction is performed automatically, with a digital confirmation from the buyer.
  dd) New data is added to the database (such as times, positions, vehicle-ID, seller, buyer, etc).
  ee) Data is exported and made accessible to any external users, such as retailers.

As in all examples, the exact procedure will be dependent on the construction and production flow of the actual production facility. Reading of existing and attachment of new RFID devices for step III) Quartering and step IV) Cutting may for instance be done in one step. Input of data to the active database can in principle be performed anywhere along the production flow.

Prior Art Flow of Production from Slaughter to Primal Cuts for Pigs

The traceability of meat is currently less advanced for pigs (as well as for sheep) than for cattle. Before entering the transport from the farm, the pigs are tattooed on the left and right side with unique ID numbers (likely without checking the tattoo from when they are born, which is often not any longer fully visible). After slaughter and in connection to the cutting of the pig into two halves these ID numbers are replaced with new codes that are stamped on each halve. The halves are classified manually by making fat estimations through making measurements by stitching at two points. The result is stamped on the halves. Image analysis methodologies for fully automatic classification of pig meat, based on such criteria as form and colour, have been developed and are now also taken into production at certain facilities. In connection to the division into primal and sub-primal cuts, barcode labels are printed for the pieces of cuts and attached. The origin of the meat is traceable down to the number tattooed on the individual in connection to the loading of the animal transport at the farm, but not to any individual animal data. Meat for production of processed products can be traced, to a limited degree, through time logs.

Figure 5:
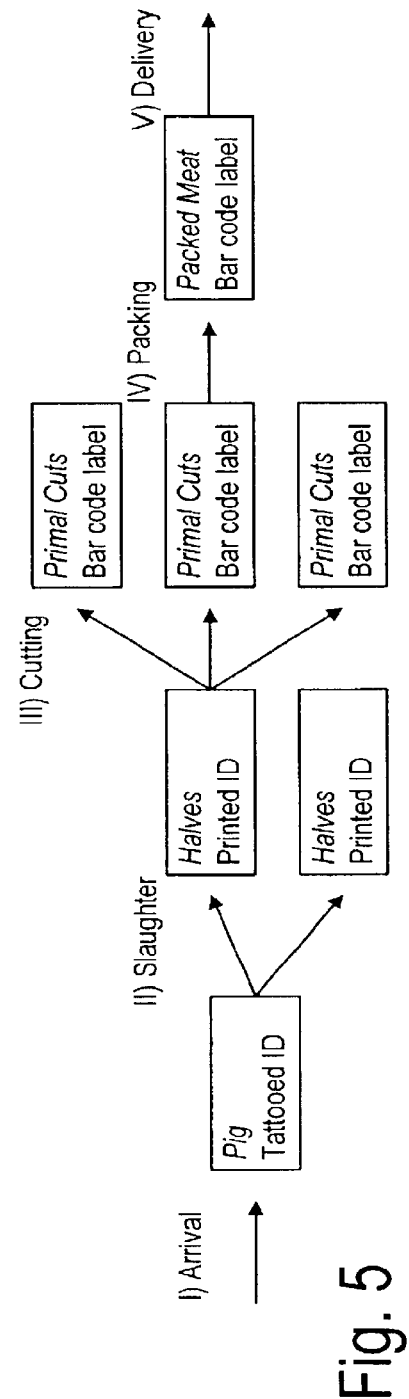
FIG. 5 schematically illustrates operations related to electronic identity and databases for the production flow of pigs from slaughter to primal cuts, packaging and delivery according to one embodiment of the present invention.

In an implementation of the method and system, according to one embodiment of the present invention, the following operations related to electronic identity and databases can be performed, as schematically depicted in the flowchart of FIG. 5 denoted with roman reference numerals, for the production flow of pigs from slaughter to primal cuts, packaging and delivery.

I) Arrival (The pig arrives and is, after off-loading the transport, transferred towards the killing space where it is killed and hanged onto the transport line).

a) Positions, time and animal-identities are registered continuously during the transport at fixed time intervals, distances or at break-points
  b) The animal-identity is registered with a reading device with a reading device at the exit of the transport.
  c) At the entrance of the slaughter facility, the animal-identity is registered with a reading device.
  d) Any external data is downloaded to the active database.

II) Slaughter (The pig is moved into the killing space and slaughtered).

e) The animal-identity is registered with a reading device in direct connection to the slaughter, for example in the opening to the killing space.
  f) Data on the pig is checked right before the killing.
  g) The body is hanged on a rail system and a new RFID device is attached to each halves of the body after slaughter, unloading, bleeding and halving, but before the quality classification).
  h) The new RFID devices are connected to the animal-identity and its database records.
  i) New data is added to the database (such as time, position, weight of the halves, quality classification, and new and replaced RFID devices).

III) Cutting (The halves are moved along the transport system to the cutting station and are cut into primal and sub-primal cuts, which are partly sorted and put on conveyor belts).

j) The identity is registered with a reading device right before the cutting.
  k) New RFID devices are attached to each cut.
  l) The new RFID devices are connected to the animal-identity and its database records.
  m) Sales and payment transactions are performed based on the value of the cuts according to the database.
  n) New data is added to the database (such as time, position, weight of the primal and sub-primal cuts, and new and replaced RFID devices).

IV) Packing (The cuts are packaged, sorted into boxes and stored in storage rooms).

o) The identities of the individual cuts are registered with a reading device in connection to the packing.
  p) New RFID devices are attached to each box, possibly being smart tags also having data storage capacity.
  q) The new RFID devices are connected to the animal-identity and its database records.
  r) The identity of the boxes is registered with a reading device when passing between and into storage departments.
  s) New data is stored in the database, and if applicable also in the smart tags (such as time, position, content and weight of boxes and new and replaced RFID devices), V) Delivery (The boxes are picked out of the storage and loaded on trucks for delivery to the destination).

t) The identity is registered with a reading device at the loading of the transport.
  u) Positions, time and box-identities are registered continuously during the transport at fixed time intervals, distances or at break-points.
  v) The identity is registered with a reading device at the unloading of the transport.
  w) The identity is registered with a reading device at the entrance to the wholesaler or retailer facility.
  x) The sales transaction is performed automatically, with a digital confirmation from the buyer.
  y) New data is added to the database (such as times, positions, vehicle-ID, seller, buyer).

z) Data is exported and made accessible to any external users, such as retailers.

Examples of RFID Tag Requisites for Industry Implementation

Tags are attachable to meat, meat cuts and meat products for one-time use, preferably being flat and thin of the size of a credit card or barcode tag.

The tags are readable at about 1–2 meters range.

The tags are functional in temperatures between −5 to +95 degrees Celsius.

Only ID is required.

World unique id numbers are not an absolute requirement.

Readable with commercially available equipment.

Possible to read manually upon failure (through printed text or barcode).

Compatible with existing standards.

Examples of Tag Reading System Requisites for Industry Implementation

Alternative A, (fixed systems)

Reading of identity from RFID tags for industry.

In addition preferably capable of reading identity from RFID tags for packaging and batch handling.

Antenna system possible to direct with an opening of 30–90 degrees and a reading range of about 1–2 meters or alternatively capable to tune into a "curtain" with about 1–2 meters range and about 1–2 meters width.

Reading system capable of being transformed for using multiple tag technologies, multiple frequencies.

On-line connection via LAN or WLAN.

Anti-collision for tens of simultaneous readings.

Possible to mount and maintain in an industrial environment.

In addition to tag ID, the following information is at certain stations possible to register and forward to the database; (a) ID of operator confirmed by a pin-code, (b) action as entered in via a keyboard or similar, (c) ID of equipment(s), which may be entered via a keyboard on an ordinary PC.

Alternative B, (product transport)

As alternative A but

Possible to attach on the gate of a transport vehicle.

Antenna systems capable to tune into a "curtain" with about 3–4 meters range and about 2–3 meters width.

Possible to integrate with either a dynamic GPS receiver or the navigation system of the vehicle.

On-line connection to a GSM-module for forward transmission of information (other cellular radio technologies may also be used).

Local data storage is available in case of any problems with local transmission.

Reading, storage and transmission of data including RFID, position, and vehicle ID.

Prior Art Production Flow at a Sausage Production Facility

Meat from beef in two basic qualities (typically 10% and 23% fat) and from pigs in two basic qualities (typically 17% and 26% fat) as well as lard of different qualities, are arriving in batches of about 400 kg. The containers are marked with identification of the slaughter facility (abattoir) and date of slaughter through tags including barcode through which a piece of meat may be possible to trace back with a precision of a number of alternative farmers. The meat is stored in the original container until minced. The minced meat is stored in steel containers of the same size and are tagged with information about day of mincing, i.e. still maintaining a, gradually blurred, degree of traceability. The minced meat is mixed with ice, salt, etc, and sorted into strictly standardised sausage meat qualities as well as some special qualities. As a part of the processing the fat content is measured and lean meat or fat is added in order to obtain the correct degree of fat. The sausage meat is tagged with day of processing and can be stored up to a week as practically all microbiologic activities has been halted. The traceability is thus further reduced but it is still possible on a number of farmers level, based on the date of marking. In the next step the correct mix of sausage meat is measured, mixed, and processed together with spices and transported to the cramming machine. The sausages are hanged on carriers and moved into smoke chambers in batches of, typically 5–8 carriers. The smoking process typically takes about 20–40 minutes and gives a temperature to the sausages of around 72 degrees Celsius. The weights of the carriers, including the sausages, are measured before and after the smoking process. Neither the carriers nor the sausages do have any specific identifiers. After the smoking the sausages are cooled, packed individually and in boxes for transport to the retailers. The boxes are marked with tags including barcode, showing the date of production and the identity of the producer.

Figure 6:
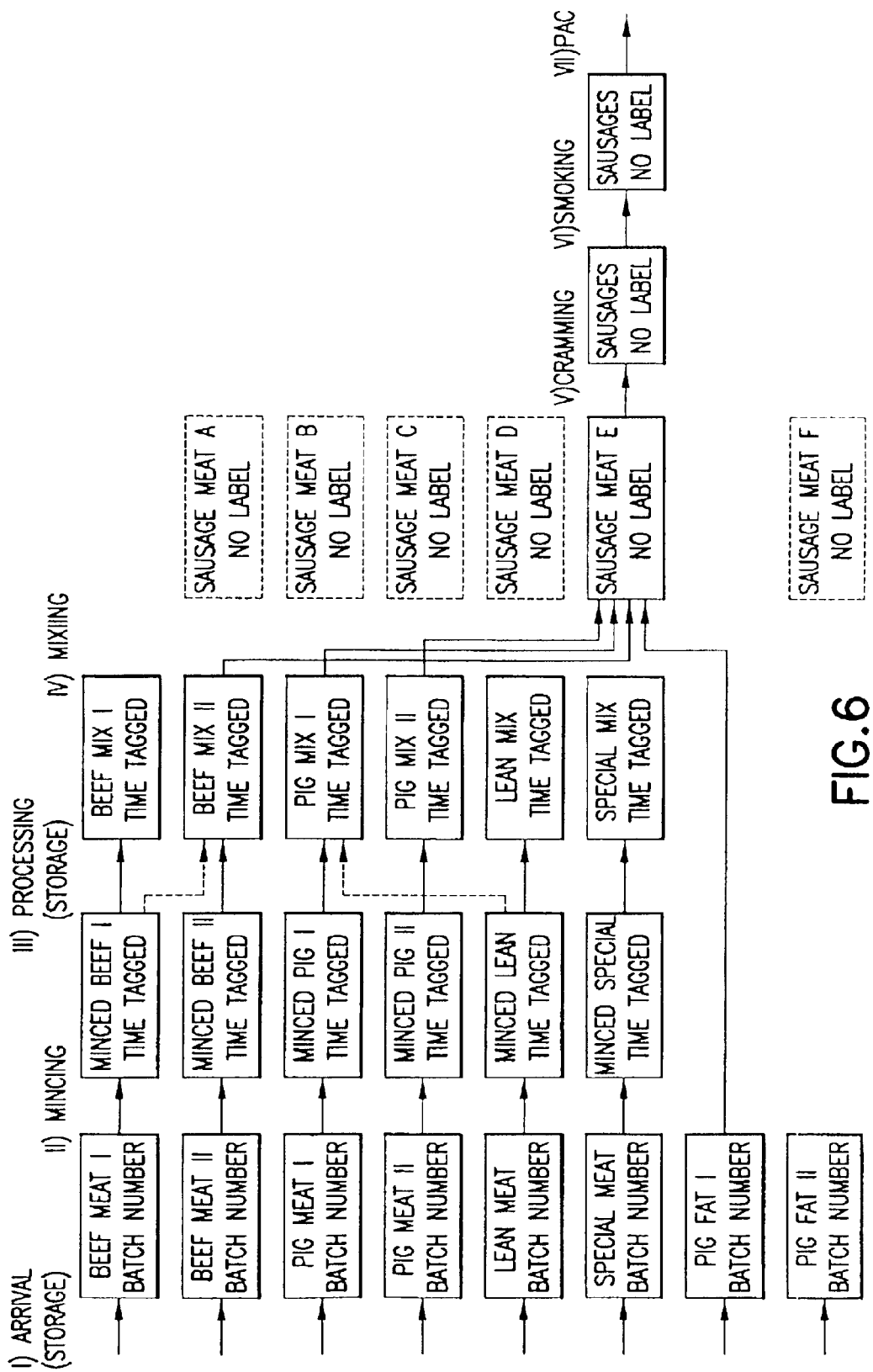
FIG. 6 schematically illustrates operations related to electronic identity and databases for the production flow of meat to sausages according to one embodiment of the present invention.

In an implementation of the method and system, according to one embodiment of the present invention, the following operations related to electronic identity and databases can be performed, as schematically depicted in the flowchart of FIG. 6 denoted with roman reference numerals, for the production flow of meat to sausages.

I) Arrival (The meat arrives in batches and is put into storage rooms).

a) Positions, time and identities are registered continuously during the transport at fixed time intervals, distances or at break-points b) The identity is registered with a reading device at the exit of the transport.

c) The RFID device, holding the batch identity, which is attached to the transport box, is registered with a reading device at the entrance to building. The batch identity can be connected back to the individual identities of the animals through the database records.

d) The batch identity is registered with a reading device at the entrance to the storage facility.

e) Any external data is downloaded to the active database and new data is added (such as time, position, weight and quality confirmation).

II) Mincing (The batches of meat is moved from the storage facility and minced).

f) The batch identity is registered with a reading device at the exit of the storage facility.

g) The batch identity is registered with a reading device just before mincing.

h) The meat is scanned for any lost RFID device or other unwanted object just before mincing.

i) New data is added to the database (such as time, metal detection verification, mincing device and position).

j) The RFID device at the outgoing transport box is given a new batch identity k) Data is stored in the database for the new batch identity (such as time, quality, mincing device and position).

III) Processing
(The batches of minced meat are processed into sausage meat by well defined qualities).
l) The batch identity is registered with a reading device just before processing.
m) Data is stored in the database (such as time, position and identities of incoming container).
n) The RFID device at the outgoing transport box is given a new batch identity.
o) Data is stored in the database for the new batch identity (such as time, quality, processing device and position).
p) The batch identity is registered with a reading device at the entrance to the storage facility.

IV) Mixing
(The sausage meat is mixed in the right proportions, lard and spices are added and are processed into ready sausage meat, which are transferred into the cramming system).
q) The batch identities of the sausage meat containers are registered with a reading device at the exit of the storage facility.
r) The batch identities of the sausage meat containers are registered with a reading device in connection to entering the mixing and processing machine.
s) Data is stored in the database (such as time, position and identities of incoming container).
t) The RFID device at the outgoing container is given a new batch identity.
u) Data is stored in the database for the new batch identity (such as time, position, identities of incoming containers, processing device and proportions of mixed ingredients).

V) Cramming
(The sausage meat is moved in pipelines or similar into the cramming machines. The sausages are hanged on carriers).
v) The batch identities of the ready mix of sausage meat containers are registered with a reading device in connection to input into the cramming system.
w) Data is stored in the database (such as time, position and identities of incoming container).
x) The RFID device at the carriers with newly crammed sausages is given a new batch identity.
y) Data is stored in the database (such as time and position).

VI) Smoking
(The carriers with sausages are smoked in a smoke-room. They are weighed before and after the smoking).
z) The batch identities of the carriers are registered with a reading device in connection to weighing before smoking.
aa) Data is stored in the database (such as time, position and pre-smoking weight).
bb) The batch identities of the carriers are registered with a reading device at entrance and/or exit to the smoking rooms.
cc) The batch identities of the carriers are registered with a reading device in connection to weighing after smoking.
dd) Data is stored in the database (such as time, position and post-smoking weight).

VII) Packing
(The carriers are moved to the packing machines where the sausages are vacuum packed and put into boxes).
ee) The batch identities of the carriers are registered with a reading device in connection to the packing.
ff) New RFID devices are attached to each package and box of sausages, possibly being smart tags also having data storage capacity.
gg) The identities of the packages and boxes are registered with a reading device in connection to storage.
hh) Data is stored in the database (such as time, position, number, weight and type).

VIII) Delivery
(The packages are moved from the storage to the trucks for transport to retailers and shops).
ii) The identities of the packages and boxes are registered with a reading device in connection to leaving the storage.
jj) The identities of the packages and boxes are registered with a reading device when entering the transport vehicle.
kk) Position and time are registered continuously during the transport at fixed time intervals, distances or at break-points.
ll) The identity is registered with a reading device at the unloading of the transport.
mm) The identity is registered with a reading device at the entrance to the wholesaler or retailer facility.
nn) Data is stored in the database (such as time and position).
oo) Data is exported and made accessible to any external users, such as retailers.

Examples of RFID Tag Requisites for Batch Handling Implementation

Tags are attachable to containers of stainless steel used for, for instance, cuts of meat or minced meat.

Intended for permanent use.

Are easily exchangeable if failing or as part of regular maintenance.

The tags are readable at a range of about 3 meters.

The tags can function in temperatures between −30 to +95 degrees Celsius.

Only ID is generally required but re-writeable tags can be employed.

World unique id numbers are not an absolute requirement.

Readable with commercially available equipment.

Failing RFID devices are easy to detect automatically.

Compatible with existing standards.

Examples of Tag Reading System Requisites for Batch Handling Implementation

Alternative A, (fixed systems)

Reading of identity from RFID tags for batch handling.

In addition preferably capable of reading the identity from RFID tags for industry and packaging.

Antenna systems capable to tune into a "curtain" with about 3–4 meters range and about 2–3 meters width.

Reading system capable of being transformed for using multiple tag technologies, multiple frequencies.

On-line connection via LAN or WLAN.

Anti-collision for tens of simultaneous readings.

Possible to mount and maintain in an industrial environment.

In addition to tag ID, the following information is at certain stations possible to register and forward to the database; (a) ID of operator confirmed by a pin-code, (b) action as entered in via a keyboard or similar, (c) ID of equipment(s), which can be entered via a keyboard on an ordinary PC.

Alternative B, (product transport)
As alternative A but

Possible to attach on the gate of a transport vehicle.

Antenna systems capable to tune into a "curtain" with about 3–4 meters range and about 2–3 meters width.

Possible to integrate with either a dynamic GPS receiver or the navigation system of the vehicle.

On-line connection to a GSM-module for forward transmission of information (other cellular radio technologies may also be used).

Local data storage is available in case of any problems with local transmission.

Reading, storage and transmission of data including RFID, position, and vehicle ID.

Prior Art Distribution Flow for Meat and Meat Products from Producer to Customer via Wholesaler At the facility of the producer of ready meat products, boxes containing packages with ready products, such as sausages, minced meat and smoked ham, are picked up from the cooled storage room in accordance with orders sent by fax, e-mail, telephone etc. They are moved into transport lorries, which transports them, according to a scheme based on the location of the buyers. The buyers can in principle be both wholesale distributors and larger supermarkets.

At delivery to the wholesaler the goods is unloaded from the transport vehicle and moved into the cooled storage room where it is stored until ordered by a retailer. Upon order it is collected from the storage room and moved to the transport vehicle for transport to the retailer by specialised transport companies or sometimes by the retailer themselves. At the retailer store the boxes are unloaded from the transport vehicle and, usually moved into a cooling room, from which it is later picked up, opened and the content is loaded on a shelf or similar for the end-customer to select from at time of purchase. The final customer picks up the goods, put it in a wagon, basket or similar, unload it in connection to the cashier, where the goods are paid for and put in, for instance, plastic bags, before taken away for consumption by the end customer.

Figure 7:
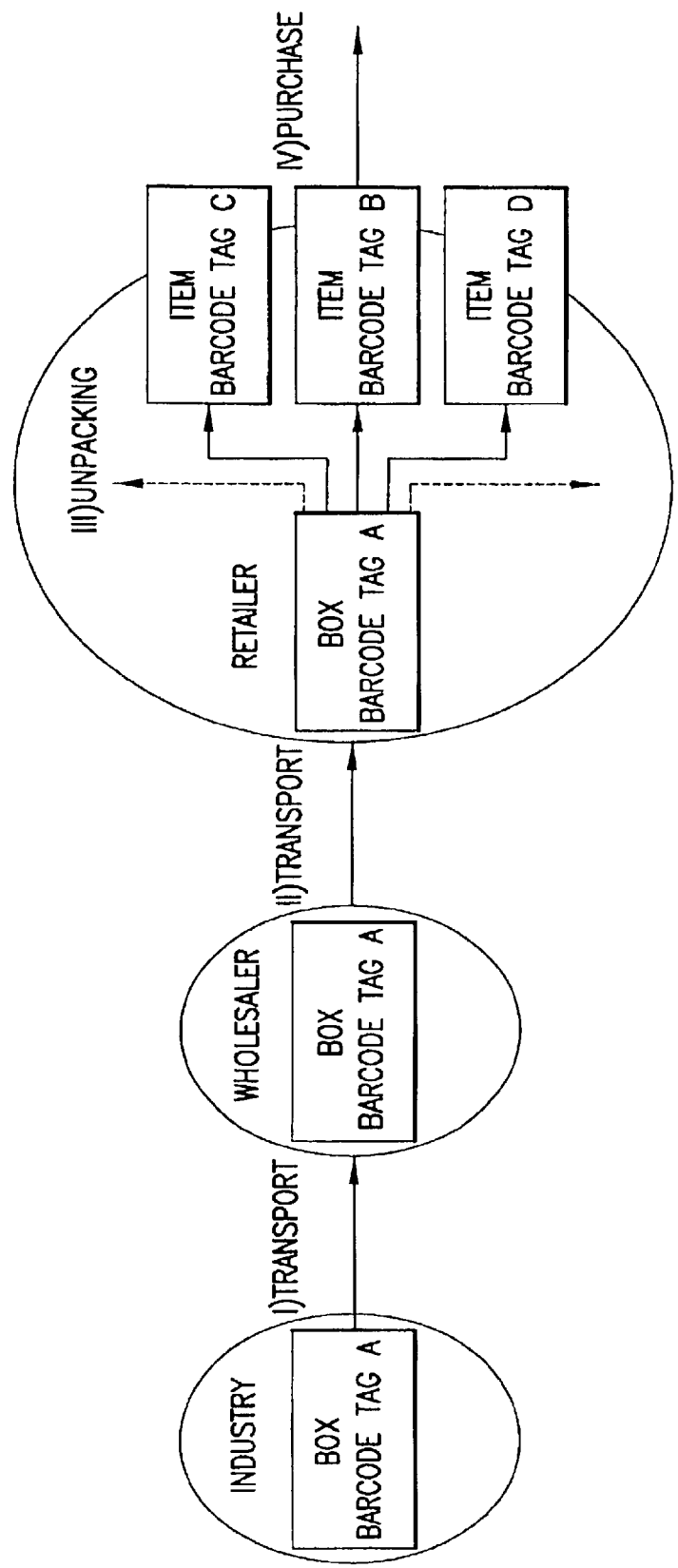
FIG. 7 schematically illustrates operations related to electronic identity and databases for the distribution of meat and meat products from the industry to a consumer, via wholesaler and retailer according to one embodiment of the present invention.

In an implementation of the method and system, according to one embodiment of the present invention, the following operations related to electronic identity and databases can be performed, as schematically depicted in the flowchart of FIG. 7 denoted with roman reference numerals, for the distribution of meat and meat products from the industry to a consumer, via wholesaler and retailer.

I) Transport (to Wholesaler)

(The boxes of meat or meat products are loaded into a vehicle and transported to the wholesaler).

a) The box-identity is registered with a reading device at the exit of the production facility for meat or meat products.

b) Positions, time and box-identity are registered continuously during the transport at fixed time intervals, distances or at break-points.

c) The box-identity is registered with a reading device at the exit of the transport.

d) New data is added to the database concerning the transport (such as times, positions, box-identities, etc).

e) At the entrance to the wholesaler, the box-identity is registered with a reading device.

f) The sales transaction is performed automatically, with a digital confirmation from the buyer.

g) At unloading at the storage room the box-identity is registered with a reading device, including time and its actual position in the storage room (the latter may be used for control of age and amount of stored products as a part of a storage management system).

h) New data is added to the database (such as times, positions, box-identities, buyer, etc).

i) The buyer downloads any required data from the database about the content of the boxes for logging and check. Alternatively, when an Internet connection is not used and when smart tags containing data is used on the boxes, the information about the content is retrieved directly from the smart tags of the boxes.

II) Transport (to Retailer)

(Based on an order from retailers the boxes of meat or meat products are picked up from the storage room loaded into a vehicle and transported to the retailer.).

j) The box-identity is registered with a reading device at the exit of the wholesalers facility.

k) Positions, time and box-identity are registered continuously during the transport at fixed time intervals, distances or at break-points.

l) The box-identity is registered with a reading device at the exit of the transport.

m) New data is added to the database concerning the transport (such as times, positions, box-identities, etc).

n) At the entrance to the retailer, the box-identity is registered with a reading device.

o) The sales transaction is performed automatically, with a digital confirmation from the buyer.

p) At unloading at the storage room the box-identity is registered with a reading device, including time and its actual position in the storage room (the latter may be used for control of age and amount of stored products as a part of a storage management system).

q) New data is added to the database concerning the transport (such as times, positions, box-identities, etc).

III) Unpacking (The boxes are unpacked and the items of the boxes are put into, for instance, the shelf).

r) The box-identity is registered with a reading device, when picked out of the storage room.

s) At unpacking of the box into single items the box-identity and the item-identities are registered (the item-identities for a box is available both on the RFID devices of the items, downloadable in the database connected the box-identification and, when applicable, as data stored in the smart-tag of the box).

IV) Purchase (The items are selected by the end customer, purchased and taken away for consumption).

t) The item-identities can be registered with a reading device at information machines, before the purchase, which present all requested data for the customers from stored data retrieved at the retailer facility or through a direct Internet connection.

u) The item-identities are registered with a reading device at the exit of the purchase area (in connection to the cashier) and can be used as a part of an automatic purchase registration system.

v) The item-registration number is printed on the receipt and can be used later by the buyer for retrieving data about the item via Internet.

Examples of RFID Tag Requisites for Packaging Implementation

Alternative A, (per piece tags)

Tags are attachable to packed pieces of meat or retailer packed products. Preferably the tags are flat and thin and printable with text and barcode information.

The tags are readable at a range of about one meter.

The tags can function in temperatures ranging between −30 to +95 degrees Celsius.

Only ID is required.

Preferably world unique id numbers.

Readable with commercially available equipment.

Compatible with existing standards.

Alternative B, (per box smart tags).

As alternative A but

In addition to ID it should be once-only writeable with several hundreds of bits information which is tamper proof.

Preferably readable with the same equipment as alternative A.

Examples of Tag Reading System Requisites for Packaging Implementation

Alternative A, (fixed systems)

Reading of identity from one or both of the alternatives a) and b) of RFID tags for packaging.

In addition preferably reading of identity from RFID tags for industry and batch handling.

Antenna system possible to direct with an opening of 60–120 degrees and a reading range of up to one meter.

Reading system capable of being transformed for using multiple tag technologies, multiple frequencies.

Anti-collision for some tens of devices, which are separable by distance and type of device.

Can be used in conventional office environment or cooling and freezing rooms.

Can be integrated with other equipment via WLAN, LAN or standard interfaces.

Alternative B, (product transport)

As alternative A but

Possible to attach on the gate of a transport vehicle.

Antenna systems capable to tune into a "curtain" with about 3–4 meters range and about 2–3 meters width.

Possible to integrate with either a dynamic GPS receiver or the navigation system of the vehicle.

On-line connection to a GSM-module for forward transmission of information (other cellular radio technologies may also be used).

Local data storage is available in case of any problems with local transmission.

Anti-collision for tens of simultaneous readings.

Reading, storage and transmission of data including RFID, position, and vehicle ID.

Prior Art Flow of Events for an Interchanging of Cattle

Below is a prior art example where a co-operative organisation in the UK is assisting the farmers with the sales and transport of very young calves. The operations are performed at an interchange facility to which the calves are physically transported for selection according to requests from buyers and later delivery to the new owners.

The calves arrive at an age of a minimum of 7 days and they may be some weeks older. At the entrance all ear tags are registered on paper form and matched to the individual animals paper passports. A temporary collar with a three-figure number is attached to each of the calves and matched to the official ID. This is done of the simple reason that a short number is much easier to handle than the long official ID. The collars are removed when the calves later leave the facility and are thus also used as an internal check of which animals that have been moved onto the transport lorries. At the office of the facility the ownership is noted either in the passport or in a temporary form, which is allowed to be used instead of the passport until 4 weeks after the birth of the calves. There are two ownership transfers made during the interchange, one from the farmer to the facility itself, which then resells the animal within the same or the next day (for distant transports an overnight rest is given to the animal) and one for the new owners.

At the entrance to the stables of the interchange facility the calves are passing via a weighing box where they are classified into typically six classes. They are sorted according to requests by the buyers, which are made at least the week before (the entire transactions are planned for one week at the time from starting Tuesday ending on Monday). Unsuitable animals are sorted out (such as for instance having a navel rupture) and are killed or returned to the seller. The animals are sorted into boxes according to the buyers requests concerning, breed, quality, etc. A representative concerning animal treatment working for an authority is present all the time. The passports of the sorted animals are filled in with the data of the new buyers. The transfer of ownership is registered into the passports and is followed by reporting into a central database through manual typing. Lorries deliver the animals to the new owners in the afternoon after proper cleaning and disinfections. Often the calves are brought up by, so called, Rearers, for about three month before being finally sold to the Farmers who keep them until slaughter, the Finalisers. The Rearers are guaranteed a sell back of the animals by the interchange facility through the farmers co-operative. The administrative work is handled by the Interchange facility on behalf of the Farmers.

Figure 8:
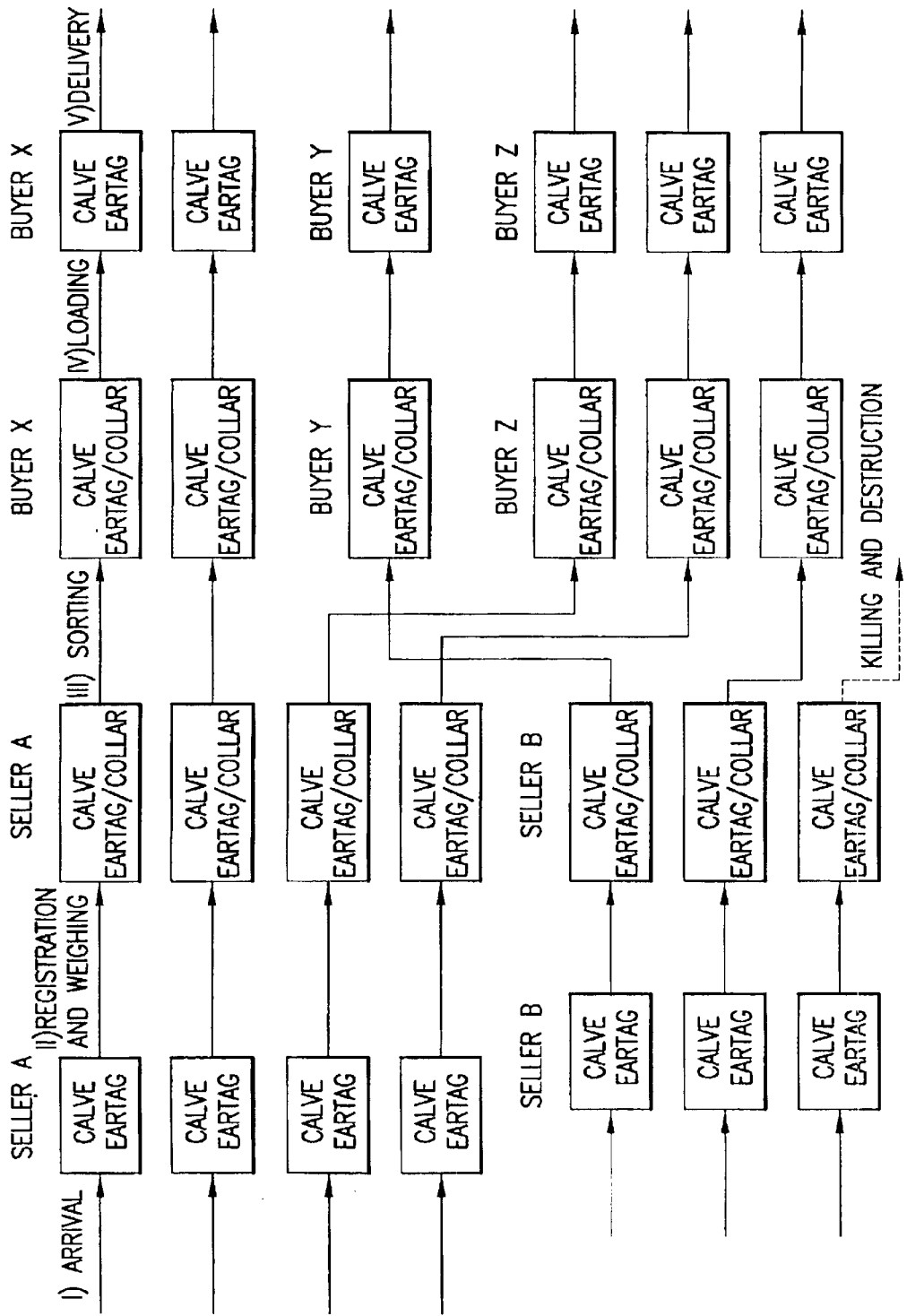
FIG. 8 schematically illustrates operations related to electronic identity and databases for the flow of events for an interchanging of cattle according to one embodiment of the present invention.

In an implementation of the method and system according to one embodiment of the present invention, the following operations related to electronic identity and databases can be performed, as depicted in the flowchart of FIG. 8 denoted with roman reference numerals, for the flow of events for an interchanging of cattle.

I) Arrival (The calve arrives exit the lorries and enters into the interchange facility).

a) Positions, time and animal-identities are registered continuously during the transport at fixed time intervals, distances or at break-points.

b) The animal-identity is registered with a reading device at the exit of the transport.

c) The animal-identity is registered at the entrance to the interchange facility.

d) Any external data, such as from an official ownership database, is downloaded to the active database.

ll) Registration and Weighing (The calves are moved into a box for weighing, classification).

e) The animal-identity is registered at the entrance to the weighing box.

f) The cattle is, weighed, inspected and graded into quality classes and, in cases, sorted out as unusable for return or killing and destruction. For each animal data such as animal-identity, position, weight, grading and, possible, return or killing and destruction is stored in the database.

g) The animal-identity is registered at the exit of to the weighing box and at all relevant gates.

h) The transfer of ownership (to the interchange facility) or possible return or killing and destruction is reported and uploaded to the official database.

III) Sorting (Buyers are selected for each animal according to their requirements).

i) The cattle are sorted into boxes in correspondence with selected buyers. The animal-identity and position is registered at the entrance of each box.

j) Data is stored in the database (such as times, positions, buyers, etc.).

IV) Loading (The animals are moved from the boxes ownerwise and loaded into the transport).

k) The animal-identity is registered at the exit of the box used for sorting and at the exit of the interchange facility.

l) Data is stored in the database, for example times, positions, vehicle id, etc.

m) The transfer of ownership (to the new owner) is reported and uploaded to the official database.

V) Delivery (The animals are transported to the new owners).

n) The identity is registered at the entrance to the transport.

o) Positions, time and animal-identities are registered continuously during the transport at fixed time intervals, distances or at break-points.

p) The identity is registered at the exit of the transport.

q) Data is stored in the database, for example times, positions, vehicle id, etc.

Prior Art Flow of Events from Rearer to Finisher for a Cattle Auctioning

The main day for a live auction is Friday. The farmers, delivering the livestock has to report their upcoming deliveries to the auctions by email, fax or phone latest Wednesday the same week. During Thursday, the day before the auction, the catalogue is printed and made available via Internet. At arrival the cattle is registered by checking the ID numbers of the cattle with the passports manually, which is followed by scanning of the identification barcodes of the passport into the computer at the office facility. The cattle are moved to boxes, maintaining that the cattle from each individual farmer still stay together. In the boxes they are available for the buyers for inspection.

At the time of auctioning the cattle from a specific farmer are transferred through a number of gates and are sorted and separated into groups of one or a few individuals with similar properties, i.e. breed, weight, grade, etc. The cattle of each farmer expected to have the highest value are moved into the auctioning room and following from the same farmers sequentially are cattle of expected lower value. Using the identities of the ear tags, the information of each cattle is shown on a large electronic board simultaneously as the cattle are entering the auction room. The auctioning is then performed and afterwards, at the exit, the animals are marked with the identity of the buyer with a simple collar or a colour dot. The animals are moved into boxes corresponding to the buyers and are later, usually on the same day, put on a transport for delivery to the buyers.

A very similar procedure is applied for example for sheep.

Figure 9:
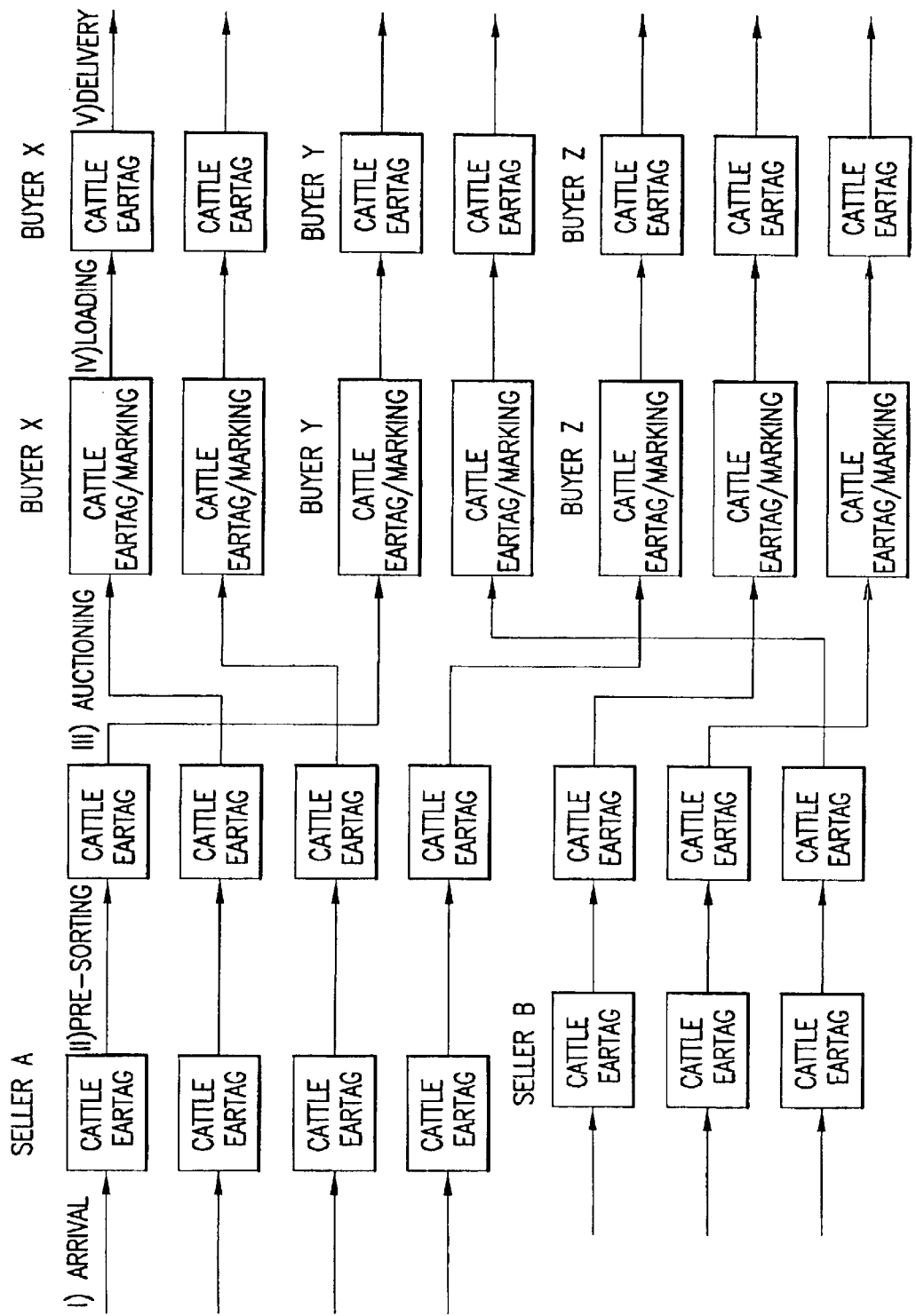
FIG. 9 schematically illustrates operations related to electronic identity and databases for the flow of events from Rearer to Finisher at a cattle auctioning according to one embodiment of the present invention.

In an implementation of the method and system according to one embodiment of the present invention, the following operations related to electronic identity and databases can be performed, as depicted in the flowchart of FIG. 9 denoted with roman reference numerals, for the flow of events from Rearer to Finisher at a cattle auctioning.

I) Arrival (The cattle arrive, enters into the auction facility and is put into boxes sorted by owner):

a) The animal-identity is registered at the entrance to the transport.

b) Positions, time and animal-identities are registered continuously during the transport at fixed time intervals, distances or at break-points.

c) The animal-identity is registered with a reading device at the exit of the transport.

d) The animal-identity is registered at the entrance to the auction facility and may be registered while passing other appropriate gates.

e) The animals are put in boxes. The animal-identities are registered at the entrance of the box.

f) Data is stored in the database for each animal, for example times, positions, vehicle id, box id, etc.

g) Any external data, such as from an official ownership database, is downloaded to the active database.

h) The transfer of ownership to the auctioning organisation is reported to the official database.

II) Pre-sorting (The cattle are moved from the boxes towards the auctioning room and is sorted in small batches of one or a few animals of similar properties before entering the auction room).

i) The animal-identities are registered at the exit of the box.

j) The animal-identities are registered at the entry of the area of gates and boxes used for sorting in connection to the auctioning hall and may be registered while passing other appropriate gates.

k) The animals are sorted and enter the box direct in connection to the auctioning room. The animal-identity is registered.

l) Data for each animal is stored in the database, for example times, positions, gate IDs, etc.

III) Auctioning (The cattle is entering the auction room, the data of each animal is shown at the electronic board, the auction is carried out and the new owners are registered).

m) The animal-identities for the entire group of animals are registered at the entrance of auction room (in case of, for instance, sheep, the number of animals entering through the gate are registered and read by the RFID simultaneously may be several tenths of animals).

n) The relevant data is read from the database and instantly displayed on the electronic board.

o) The auction is carried out. Data is stored in the database for each individual and group of individuals concerning price, new owner, times, positions, gate IDs, etc.

p) The animal-identity is registered at the exit of the auction room and may be registered while passing other appropriate gates.

q) The cattle is marked for the new owner and moved to a corresponding box where the animal-identity is read at entrance.

r) Data is stored in the database, such as times, positions, box-IDs, etc.

IV) Loading (The animals are moved from the boxes by owners and loaded into the transport).

s) The animal-identity is registered at the exit of box used for sorting and at the exit of the auctioning facility and may be registered while passing other appropriate gates.

t) Data is stored in the database, for example times, positions, vehicle id, etc.

u) The transfer of ownership to the new owner is reported to the official database.

V) Delivery (The animals are transported to the new owners).

v) The animal-identity is registered at the entrance to the transport.

w) Positions, time and animal-identities are registered continuously during the transport at fixed time intervals, distances or at break-points.

x) The animal-identity is registered at the exit of the transport.

y) Data is stored in the database, for example times, positions, vehicle id, etc.

Figure 10:
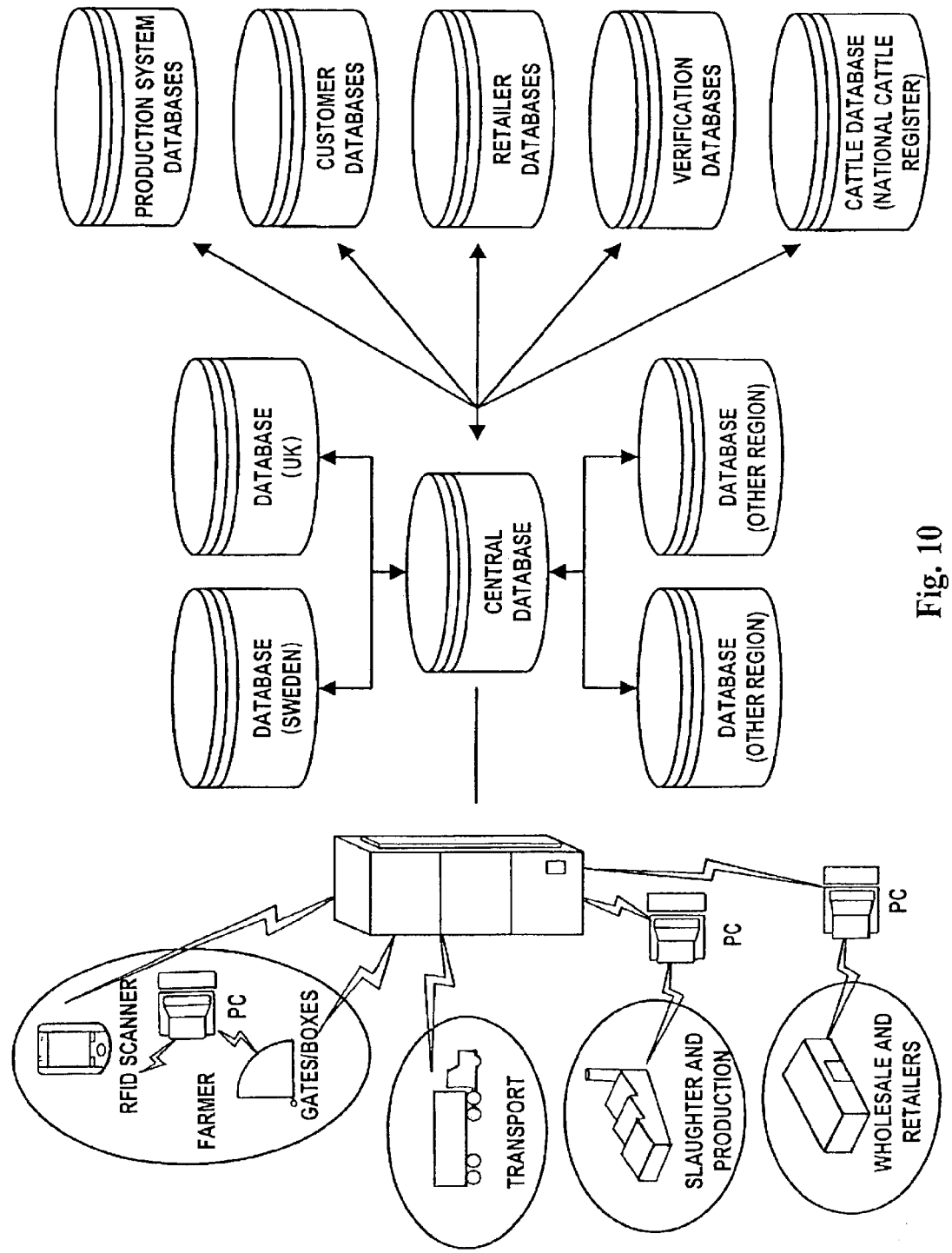
FIG. 10 schematically illustrates an embodiment of a system for controlling and authenticating quality and origin by means of electronic tagging, electronic surveillance and positioning of livestock, meat and meat products via networks for data and telecommunication and position determining means according to the present invention.

FIG. 10 schematically depicts a system according to an embodiment of the invention for monitoring, controlling and authenticating quality and origin of animals from birth through slaughter and to packaged meat products by means of electronic tags, electronic surveillance and positioning of livestock, meat and meat products via a network of connected databases, position determining means and communication through networks for data and telecommunication. Throughout the chain of events beginning with the birth of an animal leading to a meat product for sale on a market shelf, tags are continuously and wirelessly providing positioning data with a timestamp to a location in a connected database in accordance with identification codes in the tags and through identification code receivers connected to position determining means and time determining means, registering the data in code-corresponding database locations.

From birth of the animals, through the slaughter, cutting and manufacturing process, the quality of the animals, meat and products can be controlled and monitored additionally, according to one embodiment of the present invention, by using continuous records of the temperature surrounding or prevailing in the animal or product. Such temperature records can be obtained by using RFID devices with built-in temperature measurement capabilities. An RFID device for temperature measurements can be used for identification of animals, carcasses, pieces of meat, batches of meat, intermediate products and the final meat and meat products or used in addition to the RFID device used for identification for the purpose of temperature measurements only. Through the continuous use of RFID devices with temperature measurement capabilities and through a corresponding reporting and logging of the temperature in the database location corresponding to identification code for animals, meat and meat products, an unbroken chain of regular temperature measurements, which can be used for approving the utilisation of the animals, meat and meat products for final consumption, are obtained.

Through the use of RFID devices in combination with a reading system or identification code receiver in connection with a position and time determining means, which can calculate and report distance and/or direction to the RFID device at each occasion, according to another embodiment of the invention, the exact location of a RFID device can be calculated geodetically through using two or more synchronised reading systems at regular intervals, thus obtaining direct records of each animals or items movements within the limits of the antennas. This methodology may be used within animal stable environments where the possible mixing of animals of different origin shall be controlled or within manufacturing and storage environments for logging continuous time and position records of, for instance, batches of meat and meat products.

One embodiment of the present invention comprises that registrations of animal positioning data in the database are numerically compared with registered positions of alarms concerning diseases, unauthorized food content, contamination, or the like, for notifications in the database constituting possible hindrances for allowing distributing animals, meat or meat products to a market if the positioning data are found matching or close to matching according to a predetermined threshold for the positioning data Communication means can be a transponder or the like means for transmitting the code of a tag to a receiver.

Authorizing means can be software and/or an algorithm for determining animal, meat and product quality out of database information, or be provided by a manual check in the database for quality determination.

Data inputting means can be a keyboard, touch-pad, speech recognition interface or any other known input means.

Tag scanning means can be any tag reader available on the market, such as for reading RFID tags, barcodes or the like.

Means mentioned in the present description can be software means, hardware means or a combination of both.

The present invention has been described with non-limiting examples and embodiments. It is the attached set of claims that describe all possible embodiments for a person skilled in the art.

What is claimed is:

1. A method for controlling and authenticating quality and origin by means of electronic tagging, electronic surveillance and positioning of livestock, meat and meat products via networks for data and telecommunication and position determining means, comprising the steps of:

providing an animal at birth with at least one electronic tag, comprising communication means and an identification code;

updating at least one network connected database wirelessly from the at least one tag through the code to at least one receiver connected to the position determining means and a time determining means and in connection with the at least one database, registering time—and positioning information related to the animal;

providing additional information about the animal to the at least one database;

authorizing out of the additional information at least one of slaughtering and distributing actions for the purpose of at least one of meat production, meat product manufacturing and breeding;

scanning and replacing the at least one electronic tag, when the animal is slaughtered, with an additional electronic tag for each piece of meat cut up at the time of slaughter, wherein each additional tag comprises communication means and a code connecting to said at least one database, registering time—and positioning information related to the meat via the at least one receiver; and scanning and removing the additional electronic tags from the cut-up pieces of meat when refining the meat into packaged products and wherein each packaged product subsequently is provided with a replacement tag comprising communication means and a code connecting to the at least one database, registering time—and positioning information related to the meat products via the at least one receiver; and thus having an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning information together with the additional information providing traceability and verifiability of the quality and origin of the animals, meat and meat products.

2. A method according to claim 1, wherein the position of the animal, meat and meat product is determined through position determining means comprised in the at least one tag and each additional and replacement tag.

3. A method according to claim 1, wherein at least one of air and animal meat temperature is measured for the animal, meat and meat product through a temperature determining means comprised in the at least one tag and each additional and replacement tag.

4. A method according to claim 1, wherein the code in each additional tag provided at the time of slaughter is the same code as in the at least one tag provided at birth and refers to the at least one database for additional updating with slaughtering and production-related data.

5. A method according to claim 1, wherein the code in the replacement tag of each packaged product represents and connects to animal data in the at least one database in accordance with mixing of meat from different animals in the product.

6. A method according to claim 1, wherein an end customer gains access to at least part of stored animal data in the at least one database through a local computerized interface and via the code in the replacement tag for self-information of the quality and origin of animals, meat and meat products for sale.

7. A method according to claim 1, wherein the at least one tag is a transponder injected and fastened to a portion of the animal chosen from the group consisting of muscle, skeleton and nape of neck.

8. A method according to claim 1, wherein each replacement tag is a smart label fastened to a packaged product.

9. A method according to claim 1, wherein wireless registering of information is accomplished by transmitting data through at least one wireless system chosen from the group consisting of RFID-, bluetooth-, cellular radio technology and wireless local area networks.

10. A method according to claim 1, wherein the position determining means utilizes at least one position determination system chosen from the group consisting of GPS, cellular radio technology and existing geographic databases.

11. A method according to claim 1, wherein a discontinuity in animal time—and positioning data in the at least one database is notified and constitutes a possible hindrance for allowing distributing animals, meat or meat products to a market.

12. A method according to claim 1, wherein animal positioning data in the at least one database is numerically compared with registered positions of alarms chosen from the group consisting of diseases, unauthorized food content and contamination, for notifications in the at least one database constituting possible hindrances for allowing distributing animals, meat and meat products to a market if the positioning data is found matching or close to matching according to a predetermined threshold for the positioning data.

13. A system for controlling and authenticating quality and origin by means of electronic tagging, electronic surveillance and positioning of livestock, meat and meat products via networks for data and telecommunication and position determining means, comprising:

at least one electronic tag provided to an animal at birth comprising communicating means and an identification code;

at least one identification code receiver triggering time— and position registrations;

at least one network connected database being updated wirelessly from the at least one tag through the code via the at least one receiver, registering time—and positioning information related to the animal;

data inputting means for providing additional information about the animal to the at least one database;

means for authorizing, out of the additional information, at least one of slaughtering and distributing actions for the purpose of at least one of meat production, meat product manufacturing and breeding;

tag scanning means for scanning the at least one tag when the animal is slaughtered;

an additional electronic tag for each piece of meat cut up at the time of slaughter replacing the at least one tag, wherein each additional tag comprises communication means and a code connecting to said at least one database location, registering time—and positioning information related to the meat via the at least one receiver;

means for scanning the additional tag from each cut-up piece of meat when refining the meat into packaged products; and a replacement tag for each packaged product, each replacement tag comprising communication means and a code connecting to the at least one database registering time—and positioning information related to its respective meat product via the at least one receiver; and thus having an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

14. A system according to claim 13, wherein the at least one tag further comprises position determining means.

15. A system according to claim 13, wherein the at least one tag further comprises temperature determining means.

16. A system according to claim 13, wherein each additional tag provided at the time of slaughter is arranged to have the same code as the at least one tag provided to the animal at birth and to refer to the at least one database for additional updating with slaughtering and production-related data.

17. A system according to claim 13, wherein the code in the replacement tag of each packaged product represents and connects to animal data in the at least one database in accordance with mixing of meat from different animals in the product.

18. A system according to claim 13, further including at least one local computerized interface connected to the at least one database wherein the end customer, via the code in the replacement tag, can access at least part of the stored animal data for self-informing of the quality and origin of animals, meat and meat products for sale.

19. A system according to claim 13, wherein the at least one tag is a transponder arranged to be injected and fastened to a portion of the animal chosen from the group consisting of muscle, skeleton and nape of neck.

20. A system according to claim 13, wherein each replacement tag is a smart label arranged to be fastened to a packaged product.

21. A system according to claim 13, wherein wireless registering of information is arranged to be accomplished through at least one wireless system chosen from the group consisting of RFID-, bluetooth-, cellular radio technology and wireless local area networks.

22. A system according to claim 13, wherein the position determining means is arranged to utilize at least one position determination system chosen from the group consisting of GPS, cellular radio technology and existing geographic databases.

23. A system according to claim 13, wherein a discontinuity in animal time—and positioning data in the at least one database is notified and arranged to constitute a hindrance for allowing distributing animals, meat and meat products to a market.

24. A system according to claim 13, wherein animal positioning data in the at least one database is arranged to be numerically compared with registered positions of alarms chosen from the group consisting of diseases, unauthorized food content and contamination for notifications in the at least one database constituting possible hindrances for allowing distributing animals, meat and meat products to a market if the positioning data is found matching or close to matching according to a predetermined threshold for the positioning data.

* * * * *

UNITED STATES PATENT AND TRADEMARK OFFICE
CERTIFICATE OF CORRECTION

PATENT NO.         : 6,878,052 B2                                    Page 1 of 19
APPLICATION NO. : 10/262678
DATED              : April 12, 2005
INVENTOR(S)       : Hakan Andersson It is certified that error appears in the above-identified patent and that said Letters Patent is hereby corrected as shown below:

PLEASE DELETE COLUMNS 1-32 AND INSERT COLUMNS 1-36 AS SHOWN ON THE ATTACHED PAGES

Signed and Sealed this

Twenty-fifth Day of March, 2008

JON W. DUDAS
*Director of the United States Patent and Trademark Office*

METHOD AND SYSTEM FOR CONTROLLING MEAT PRODUCTS

TECHNICAL FIELD

The present invention pertains to a method and a system for controlling and authenticating quality and origin of meat products by means of electronic tagging and electronic surveillance and positioning of livestock, meat and meat products via networks for data and telecommunication, position determining means, and said networks having connected database servers, in addition capable of communicating with external databases of users and authorities.

BACKGROUND ART

It is becoming more and more of an important issue for people to be informed of the origin and history of food products they are about to purchase, i.e. where do they come from, how- and under what circumstances were they fabricated. Methods and traditions for growing and refining crops and animals into food products are currently issues of great importance and interest for the population in many countries. An overall consciousness can be seen steadily growing globally regarding potential risks involved with what you eat, especially when regarding that meat products from certain parts of the world already has been subjected to contamination, perhaps due to dubious breeding methods and an overall ill-treatment of the livestock. Since such livestock also may be exported in a larger scale, both for the purpose of crossbreeding and for further processing into meat products, the problems thus risk spreading globally in an accelerating rate.

Trends like growing vegetarianism and peoples increasing alienation from meat products is therefore not an illogical consequence in the longer term, when current methods for controlling and ensuring the quality and certainty of origin of meat products as a fact are uncertain and widely mistrusted. Because of fears of an epidemic spread of livestock-related diseases, governments in many countries that import meat and livestock, are putting up strict regulations for such imports, where demands on untamperable and foolproof documentation of animal-life history are put forth as a requirement for allowing continuing with such activities.

Such documentation is currently not accomplished in a sufficiently accurate and secure manner and is mostly performed through manual recording of animal-history related information such as date and place of birth, sickness and medical related data and so forth either on paper or electronically. The registrations are often performed by the livestock-owners without an adequate control of authenticity of the recorded data and many times on a more local basis without connection to any internationally prevailing standards or requirements. Changes in the geographical whereabouts of a specific animal during its lifetime are for example often not recorded properly and ambiguous positions or positions with insufficient accuracy and reliability may be registered, causing problems e.g. when animals are moved to areas where there may be locally present diseases, which would have to be registered since symptoms of contamination of an animal could be revealed at a much later date e.g. when the animal already has been exported or slaughtered for meat. The absence of regular, complete and unambiguous location history records disables the possibilities to reliably and efficiently identify animals which has been in contact with any problem areas related to diseases, etc.

The animals are sometimes marked for identification purposes by providing a chip or strip of barcode in the ear containing a registration number. Such markings are, if not at least complemented with more permanently attached identification means, easily manipulated, e.g. by just cutting off the ear with the chip from an animal, there are suddenly no means for identification and therefore no reference to the animal-history of that particular animal. Such strips of barcode can also easily fall off leaving the animal unmarked and without a recorded life history.

Since the state of origin declared on meat products for sale also has been proven incorrect at numerous occasions, people are thus made aware of the mentioned shortcomings of current animal registration and marking methods and tend to start avoiding certain meat products due to the risk of contamination and also for ethical reasons.

Other problems originating from current methods of recording and handling animal history-data relate to the time-consuming and extensive effort of manually comparing an identified animal with its recorded history at the time of slaughter or export and also the overall insecurity of the method i.e. that so many opportunities are given for someone wanting to manipulate either the animal history records or the animal markings for the sake of concealing animal-history data that otherwise would lead to a rejection of allowing slaughtering- or exporting actions.

The requirements of storing and analysing history-records, especially concerning location, are equally needed within production and processing of meat and meat related products where contact between any animals, any pieces of meat or any products can be efficiently monitored and where significant gains in production efficiency can be obtained.

There seems to be a need for a more standardized, secure and precise method for marking and monitoring animals and for handling registered animal data for the sake of providing accurate animal life-history data as a basis for allowing export and import of livestock and meat and fabrication of meat products according to set quality regulations.

SUMMARY OF THE DISCLOSED INVENTION

The present invention relates to a method and a system for controlling and authenticating quality and origin of meat products for ensuring that the animals to be exported and/or slaughtered, subsequently becoming meat products, are free of diseases and have been bred and generally treated in a satisfactory way.

One object of the invention is to provide such a method and system, incorporating an alarm function for automatic warning of livestock, meat and meat products being in risk of contamination and/or disease. By continuously registering numerical information about the animals location and, consecutively, the location of meat, pieces of meat and meat products, database records can be compared and any direct- or near contact between an animal or a meat product with a potential problem can be detected and instantly alarmed. The location of any piece of the animal or any product potentially made from the animal can upon an alarm be almost immediately located and be prohibited from further distribution.

To achieve aims and objectives the present invention provides a method for controlling and authenticating quality and origin by means of electronic tagging, electronic surveillance and positioning of livestock, meat and meat products via networks for data and telecommunication and position determining means. The method comprises the steps of providing an animal at birth with at least one electronic tag, comprising communication means and an identification code;

representing, through the code, a specific location in a network connected database, being updated wirelessly from the tag to at least one receiver connected to the position determining means and a time determining means and in connection with the network, registering time- and positioning information related to the animal;

providing additional information about the animal to the database;

authorizing out of the information at least one of slaughtering and distributing actions for the purpose of at least one of meat production, meat product manufacturing and breeding;

scanning and replacing the tag, when the animal is slaughtered, with an electronic tagging of each piece of meat cut up at the time of slaughter, wherein each additional tag comprises communication means and a code connecting to the database location, registering time- and positioning information related to the meat via the receiver; and scanning and removing the tags from the cut-up pieces of meat when refining the meat into packaged products and wherein each packaged product subsequently is provided with a replacement tag comprising communication means and a code connecting to at least one database location, registering time- and positioning information related to the meat products via the receiver; and thus having an unbroken chain of time- and positioning information and additional information providing an enhanced means for detecting and avoiding livestock, meat and meat products having been positioned in areas where sickness has been known during an animal's lifetime or time as meat or meat product, and the continuity in time and positioning data together with the additional information providing traceability and verifiability of the quality and origin of the animals, meat and meat products.

In one embodiment of the method according to the present invention, the position of the animal, meat or meat product is determined through position determining means comprised in the tag.

In another embodiment of the method according to the present invention, at least one of air and animal meat temperature is measured for the animal, meat or meat product through a temperature determining means comprised in the tag.

In yet another embodiment of the method according to the present invention, each additional tag provided at the time of slaughter has the same code as the tag provided at birth and refers to the database location for additional updating with slaughtering and production-related data.

In a further embodiment of the method according to the present invention, the code in the tag of each packaged product represents and connects to animal data in one or more locations in the database in accordance with the mixing of meat from different animals in the product.

In yet a further embodiment of the method according to the present invention, an end customer gains access to at least part of the stored animal data through a local computerized interface and via the code in the tag for self-information of the quality and origin of animals, meat and meat products for sale.

In other embodiments of the method according to the present invention, the tag is a transponder injected and fastened in the muscle or skeleton of the animal, preferably in the nape of the neck, the tag is a transponder fastened to a piece of meat or the tag is a small label fastened to a package of meat.

In yet other embodiments of the method according to the present invention, the wireless registering of information is accomplished by transmitting data through RFID-, bluetooth-, cellular radio technology or wireless local area networks and the position determining means utilizes GPS, cellular radio technology or existing geographic databases.

In yet one embodiment of the method according to the present invention, a discontinuity in animal time- and positioning data in the database is notified and constitutes a possible hindrance for allowing distributing animals, meat or meat products to a market.

In a following embodiment of the method according to the present invention, registrations of animal positioning data in the database are numerically compared with registered positions of alarms concerning diseases, unauthorized food content or contamination, for notifications in the database constituting possible hindrances for allowing distributing animals, meat or meat products to a market if the positioning data are found matching or close to matching according to a predetermined threshold for the positioning data.

The present invention further sets forth a system for controlling and authenticating quality and origin by means of electronic tagging, electronic surveillance and positioning of livestock, meat and meal products via networks for data and telecommunication and position determining means. The system comprises:

an electronic tag, provided to an animal at birth comprising communicating means and an identification code;

at least one identification code receiver triggering time- and position registrations;

a network connected database wherein a specific location is represented through the code, the database location being updated wirelessly from the tag via the receiver, registering time- and positioning information related to the animal;

data inputting means for providing additional information about the animal to the specific database location;

means for authorizing, out of the information, at least one of slaughtering and distributing actions for the purpose of at least one of meat production, meat product manufacturing and breeding;

tag scanning means for scanning and replacing the tag, when the animal is slaughtered, with an electronic tagging of each piece of meat cut up at the time of slaughter, wherein each additional tag comprises communication means and a code connecting to the database location, registering time- and positioning information related to the meat via the receiver; and scanning and removing the tags from the cut-up pieces of meat when refining the meat into packaged products and wherein each packaged product subsequently is provided with a replacement tag comprising communication means and a code connecting to at least one database location, registering time- and positioning information related to the meat products via the receiver; and thus having an unbroken chain of time- and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

In one embodiment of the system according to the present invention, the tag further comprises position determining means.

In another embodiment of the system according to the present invention, the tag further comprises temperature determining means.

In a further embodiment of the system according to the present invention, each additional tag provided at the time of slaughter is arranged to have the same code as the tag provided to the animal at birth and to refer to the database location for additional updating with slaughtering and production-related data.

In yet one embodiment of the system according to the present invention, the code in the tag of each packaged product represents and connects to animal data in one or more locations in the database in accordance with the mixing of meat from different animals in the product.

In yet another embodiment of the system according to the present invention, an end customer through a local computerized interface and via the code in the tag have means for accessing at least part of the stored animal data for self-informing of the quality and origin of animals, meat and meat products for sale.

In other embodiments of the system according to the present invention, the tag is a transponder arranged to be injected and fastened in the muscle or skeleton of the animal, preferably in the nape of the neck, the tag is a transponder arranged to be fastened to a piece of meat or the tag is a smart label arranged to be fastened to a package of meat.

In yet other embodiments of the system according to the present invention, the wireless registering of information is arranged to be accomplished through RFID-, bluetooth-, cellular radio technology or wireless local area networks and the position determining means is arranged to utilize GPS, cellular radio technology or existing geographic databases.

In yet a further embodiment of the system according to the present invention, absent or discontinuous registrations of time- and positioning data in the database is notified and arranged to constitute a hindrance for allowing distributing animals, meat and meat products to a market.

In a following embodiment of the system according to the present invention, registrations of animal positioning data in the database are arranged to be numerically compared with registered positions of alarms concerning diseases, unauthorized food content, contamination, or the like, for notifications in the database constituting possible hindrances for allowing distributing animals, meat or meat products to a market if the positioning data are found matching or close to matching according to a predetermined threshold for the positioning data.

BRIEF DESCRIPTION OF THE DRAWINGS

Henceforth reference is had to the attached figures for a better understanding of the present invention and its examples and embodiments, wherein the:

FIG. 1 schematically illustrates a monitoring and data collecting of a tagged animal according to one embodiment of the present invention.

FIG. 2 schematically illustrates operations related to electronic identity and databases for the production flow of cattle from birth until slaughter according to one embodiment of the present invention.

FIG. 3 schematically illustrates operations related to electronic identity and databases for the production flow of pigs from birth until slaughter according to one embodiment of the present invention.

FIG. 4 schematically illustrates operations related to electronic identity and databases for the production flow of cattle from slaughter to primal cuts, packaging and delivery according to one embodiment of the present invention.

FIG. 5 schematically illustrates operations related to electronic identity and databases for the production flow of pigs from slaughter to primal cuts, packaging and delivery according to one embodiment of the present invention.

FIG. 6 schematically illustrates operations related to electronic identity and databases for the production flow of meat to sausages according to one embodiment of the present invention.

FIG. 7 schematically illustrates operations related to electronic identity and databases for the distribution of meat and meat products from the industry to a consumer, via wholesaler and retailer according to one embodiment of the present invention.

FIG. 8 schematically illustrates operations related to electronic identity and databases for the flow of events for an interchanging of cattle according to one embodiment of the present invention.

FIG. 9 schematically illustrates operations related to electronic identity and databases for the flow of events from Rearer to Finisher at a cattle auctioning according to one embodiment of the present invention.

FIG. 10 schematically illustrates an embodiment of a system for controlling and authenticating quality and origin by means of electronic tagging, electronic surveillance and positioning of livestock, meat and meat products via networks for data and telecommunication and position determining means according to the present invention.

WORDLIST

RFID (Radio Frequency IDentification) is a data collection technology that uses electronic tags to store identification data and a wireless transmission method to capture the data.

A handheld computerized device can be a laptop computer, a PDA or the like comprising cellular radio equipment, a WAP telephone device etc.

WAP (Wireless Application Protocol) enables a WWW connection through a cellular telephone.

An open network for data communication can be the WWW or other like open networks, Intranet etc.

A PDA (Personal Digital Assistant) is a handheld computer that serves as an organizer for personal information.

SMS (Short Message Service) is a text message service that enables short messages of genetally no more than 140-160 characters in length to be sent and transmitted to and from a device for mobile communication, like a cellular telephone.

GSM (Global System for Mobile Communications) is a digital cellular phone technology, which can be utilized for telecommunication and positioning purposes. Similar technologies fulfilling the same purposes are for example D-AMPS, CDMA and UMTS.

GPS (Global Positioning System) is a system of 24 satellites for identifying earth locations. By triangulation of signals from three or more of the satellites, a receiving unit can pinpoint its current location anywhere on earth to within a few meters. Similar technologies fulfilling the same purposes are the Russian GLONASS system and the forthcoming European Galileo systems.

DETAILED DESCRIPTION OF PREFERRED EMBODIMENTS

The present invention sets forth a method and a system for controlling and authenticating quality and origin of livestock, meat and meat products both for the sake of allowing animal and meat product distribution, exporting and importing activities and for providing an end customer with a means for self-informing of the origin and history of animals, meat and meat products for sale on a market or in a store. The animal, and subsequent meat products, are monitored in an unbroken historical chain, including transportations, based on unambiguous numerical position records, enabling automatic analysis and detection of any encounters or close-encounters with problems, such as diseases, contaminations and the like, directly from the database records.

A system according to a preferred embodiment of the present invention comprises an electronic tag 20, provided to an animal 10 at birth comprising communicating means and an identification code. Included in the system is also at least one identification code receiver 40 triggering time— and position registrations and a network connected database 60 wherein a specific location is represented through the code. The database location is updated wirelessly from the tag 20 via the receiver 40, registering time—and positioning information related to the animal 10. The system further comprises data inputting means for providing additional information about the animal to the specific database location and means for authorizing, out of the information, at least one of slaughtering and distributing actions for the purpose of at least one of meat production, meat product manufacturing and breeding. Incorporated in the system is also tag scanning means for scanning and replacing the tag, when the animal is slaughtered, with an electronic tagging of each piece of meat cut up at the time of slaughter, and each additional tag comprises communication means and a code connecting to the database location, registering time—and positioning information related to the meat via the receiver. The additional tags are then via system-included scanning means scanned and removed from the cut-up pieces of meat when refining the meat into packaged products and each packaged product is subsequently provided with a replacement tag comprising communication means and a code connecting to at least one database location, registering time—and positioning information related to the meat products via the receiver. The system according to the preferred embodiment of the invention thus achieving an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

FIG. 1, in one embodiment of the present invention, illustrates how different animal-related events can be monitored and registered throughout the length of an animal's 10 life by means of at least one electronic tagging 20, performed on the animal 10 when newly born. Animal life-history data, including numerical positions, such as e.g. information on date and place of birth and death, breeding- and feeding-info, information on current and past ownership, genealogical-info, medical- and sickness-info, transporting- info and slaughtering-info, can be continuously registered and updated, e.g. by authorized personnel such as certified veterinaries or controllers, via wireless communication 50 and networks for data and telecommunication, said networks having connected database servers 60, wherein the data is stored in a specific location correlating to an animal-unique identification code in the tag 20 of each tagged animal 10.

According to an embodiment of the invention, database servers 60 are communicating with external databases 70 for collecting data from the external databases, such as official registration data, and providing data for the external databases 70, such as production databases and retailer databases, seamlessly and data format independent.

The animal's 10 geographical positioning can be electronically monitored and automatically registered, either continuously at predetermined time intervals, when the position of the animal 10 has changed more than a predetermined set distance from an originally defined geographical area, or when the animal is passing through positioned entry and exits gates, via positioning and communication means in the animal tagging by RFID, GPS or GSM or other similar technologies.

In order to be able to monitor and keep track of both stationary animals as well as of animals being transported, according to one embodiment of the present invention, powerful position coordinate receivers 40, e.g. comprising GPS receivers, RFID-antennas or the like means for communicating position coordinates wirelessly 50 from the animal tags to the specific locations in the network of databases 60, are provided around the vicinity of the animals e.g. in the farmhouse indoors and on the fencing of the animal enclosure 30 outdoors. Additional receivers are furthermore provided in the possible transporting means, e.g. the truck, ship, train or such may be connected to the navigation system and/or fleet management system of the transport vehicle and also at and around the destination location of the animals, thus providing an uninterrupted monitoring and registering of an animal's positions also during relocation. Authorized personnel can alternatively also manually register the changing of location of tagged animals e.g. in cases where the recording due to some reason does not function. During the meat-based production, after the slaughter, position coordinates are obtained at all positions where tags are read, keeping the location-history records unbroken throughout the production.

A notification, warning, is automatically registered in the database in case of missing or discontinuous position coordinate registrations, indicating that one or more animals have been relocated without due control and surveillance and this provides a reason for e.g. rejecting exporting actions as well as slaughtering actions for the purpose of using the meat in production. An inspector e.g. at a border control or at a slaughtering facility can, through database access via the unique identification code in the animal tag and via a local computerized interface, e.g. a PDA, a laptop or stationary computer, a cellular telephone with WAP capability or the like handheld or stationary computerized means for connection with a network of databases, directly check on the status of a particular animal for allowing or rejecting that animal. A manually input position registration performed by authorized personnel and covering the missing registrations can also withdraw the previously registered warning, which then won't constitute a future hindrance for export or fabrication of meat products.

Positional records, in the form of numerical co-ordinates can, in case of any problems or alarms concerning diseases, unauthorized food content, contamination, etc. be cross checked automatically, through numerical methods, by comparing the position records of animals and products with the position of the problem object or area. A safety zone of selected size or form surrounding the problem object can be used for identification of animals and food products being in risk of having been in contact with the problem. Animals or food products susceptible of having been in contact with a problem or problem area can be noted in the database for the purpose of rejection of further actions, like slaughter, transport, distribution, export, etc.

The utilization of database records for logging the activities concerning animals, meat and meat products are in itself a large progress concerning traceability and verification of their origin. In addition to this, the present invention is based on the obligatory inclusion of numerical and unambiguous position records in all phases of the animal life, as well as in the production and distribution of meat and meat products—in combination with the recording of events and movements—and including the logging of the original source of each data record. The availability of historical position records further enhances the traceability and verifiability of the origin of the products in all steps, and gives all involved parties additional and significant advantages as compared to database records being without complete unambiguous numerical positions.

According to one embodiment of the present invention, the tag can be a transponder, smart label, code plate or the like means for electronic marking and can for example have a unique identification number sequence stored in a chip, which number sequence can be sent directly to the network of databases through GSM-technology, or other wireless telecommunication technologies, over an open network for data communication like the internet or through an antenna system in connection with a handheld or stationary reader, whereby the reader communicates with the chip and sends out a protocol wirelessly via the antenna system to the network of connected databases for interpretation by software therein, which extracts and communicates the unique identification number sequence corresponding to a specific location in a database and allows entering of the animal-history data when an authorization code, centrally provided to authorized system managers e.g. certified veterinaries, controllers or the like authorized personnel, has been entered and accepted by authorization software in the system. Such authorization of system managers can e.g. be performed on a governmental- or the like higher official level for security reasons and according to nationally and/or internationally prevailing standards, regulations or requirements.

The actual marking of newly born animals can, in one embodiment of the present invention, be performed by authorized personnel e.g. certified veterinaries, controllers injecting the tag, such as a transponder or the like, into the muscle or skeleton of the animal for example in the nape of the neck. Thus providing an electronic marking, which is well hidden and difficult to remove for manipulating purposes. When an animal 10 is detected by a receiver 40, for example through the electronic tagging 20 communicating with the receiver 40 wirelessly 50, the unique code in the tag 20 is wirelessly read and communicated 50 via GPS-, RFID- or cellular radio-technology as for example GSM, or by suitable electromagnetic radiation such as RF or the like for automatic position registration in the network of databases 60. The time and date is correspondingly registered for each position registration in the database 60 for following an animal's 10 different positioning in time. The time—and position registrations can alternatively be performed continuously in time providing real-time positioning information of the animal 10. The identification code receiver also has data transmitting capabilities for handling forwarding the time—and positioning data to the database for storage in a database location in accordance with the identification code attached to the transmitted data.

For manually entering animal-data, a handheld receiver can be used for reading the code in the tag or the identification code can be input manually and can, together with a system authorization code, give access to authorized entering of additional data such as history data for a particular animal into the database. The data can then e.g. manually input over an open network for data communication like the Internet through a portable or stationary computer, PDA or cellular phone with WAP, or other mobile Internet, capabilities or communicated via voice instructions or SMS through a network for telecommunication like the GSM to a centrally located authorized system manager, who in turn manually inputs the communicated data into the database. Data of different authorization levels may be allowed to be stored in the network of databases 60 by marking the data with the origin and authorization level of the data. At export to external databases 70, the authorization of the data will always be verified.

The database-stored animal data can then also be checked by utilizing a reader communicating the code to the system or by manually inputting the identification code according to the above mentioned steps, for example by an inspector at customs control and according to requirements set by a predetermined standard for allowing exporting or importing animals or meat, or at a slaughtering, cutting or sausage facility, according to requirements set by a predetermined standard for distributing meat products to a market, for allowing fabrication of meat products or alternatively by a person wanting to purchase a tagged animal, wanting to secure the quality and origin of that particular animal, for example for the sake of breeding.

After approval by an inspector, or other authorised person, at a slaughtering facility, when cutting up pieces of an animal 10 for meat production, each piece of meat originating from one tagged 20 animal 10 is provided with additional tags comprising the same unique code or a replacement code referring to the same database location 60 and additional slaughtering data can be entered into the system by an authorized controller or by production personal given authorization to enter such data. The scanning and replacement of tags during the slaughtering and meat cutting process may be performed in more than one step. In this way, individual pieces of meat can be checked according to the steps mentioned above for animal history data regardless of the future location of the different pieces of meat originating from that animal 10, for example when the time comes for further refining such pieces of meat into packaged products. In connection with the further refining of the tagged pieces of meat into different products, the tags are removed from the meat and each packaged product is subsequently provided with an electronic replacement tagging or marking comprising at least one code corresponding to the meat content of the product and representing animal history data in one or more locations in the database 60 depending on the mixing of meat from different animals in the product.

Time—and positioning information is continuously being provided to the database from the replacement tags arranged to the pieces of meat at the time of slaughter and to the meat products after packaging, via receivers being connected to position determining means and time determining means and in connection with the network of connected databases, and being strategically positioned in the vicinity of the meat and meat products.

In one embodiment of the present invention such replacement markings can for example be smart labels having a chip mounted inside with RFID technology and a memory function, for storing data in different memory blocks and into which authorized personnel can copy chosen animal data from the database 60 for end customer information purposes and upon which label it is possible to write with printers. The data, thus stored directly on a package of meat, can then easily be read from the small label by a handheld or stationary reader connected to an antenna, as described in steps above, for example by a customer in a marketplace wanting information of the quality and origin of the meat, and there can also be a connection to a computer system or a network. The animal history data can then for example be presented on the screen of a computerized interface 80. The electronic replacement marking on a packaged product can alternatively be provided with one or more of the identification codes from the original animal taggings provided at birth or with a replacement code in accordance with the meat content of the product and enabling connection to all or predetermined parts of the database 60 stored animal data through the codes and for example via a computerized interface 80 in a marketplace and on an electronic screen informing an end customer of the quality and origin of the meat. The possibility to write with printers on the outside or surface of a small label makes it furthermore useful for product information to customers with, e.g. bar code for storage, producer logotype, price and so forth.

According to one embodiment of the present invention, the farmers are able to obtain information instantly on the actual location of all animals, preferably using a graphical map display being connected to the network for retrieving the therein-stored positional data of the relevant animals. In case of problems, related to diseases, contamination, or the like, the farmers can numerically search for all animals having been in the vicinity of the problem, in a definable space and time, by automatic numerical standard methods used within areas such as Geodesy and Geoinformatics. This includes problems on their own farm, as well as on other farms and facilities, where the animal has been located previously. In case of any problems detected later during the food production the corresponding search can be made, for example by the meat production industries in order to locate other animals, which are in risk of being affected.

Medical record data shall, in one embodiment of the invention, be added directly at the time of the medicinal activity, by an authorized veterinary or by the farmer or other person given authorization by the veterinary. The positional information of the medical record then can be matched with other computerized or not computerized records such as the veterinary doctor's agenda and other activities of the farmers for post verification.

In a further embodiment of the invention, sales transactions can be automatically reported and verified by the positional records of the animal movements in connection to the transport between two farmers facilities or from a farmer to a slaughter house, reducing administrative cost and improving the security further of the transaction. Information concerning an animal or group of animals can be accessed in connection to auctions and other sales activities and give immediate confirmation on all physical locations an animal or a group of animals have been at during its previous life in addition to other animal data.

A further embodiment of the invention accomplishes that in connection to transports within a farm, between farms and between farms and the slaughter facilities (abattoirs), the positions are acquired through independent storage devices, such as GPS, or by connecting directly to existing and verified car navigation and fleet management tools of the transport company. Through the complete, numerical and unambiguous positioning, records any contacts with diseases, contaminated material or the like, can be automatically and numerically identified in real time. This includes also just passing through an area with a transport, for detection of possible contact with, for instance, airborne and highly contaminant diseases such as the foot and mouth disease. The obligatory use of positioning also during transport concerning animal, meat and meat products additionally gives logistical advantages such as possibilities of precise pre-delivery announcements and improved production and distribution planning.

During a slaughter and cutting process it is necessary to replace animals identification tags, whether they are electronic devices or just barcode or text tags. This opens the possibility of frauds or mistakes concerning the origin of the meat and meat products unless positioning records are used. Through the availability of continuous and complete, unambiguous, numerical positioning records as of the method and system according to the present invention, the meat and meat products can be automatically and numerically checked for continuity in time and position, independent of production environment, eliminating the possibilities of frauds and errors during cutting and meat production.

In meat related production, such as for manufacturing sausages, the identity of the individual pieces of meats, according to one embodiment of the present invention, are replaced by the identity of transport containers or batches. By continuously storing not only the identities, actions and time of each event, but also the numerical unambiguous positions of each container at each time, any frauds or mistakes concerning the content, age of the content, or the like can similarly be detected by automatic numerical analysis of the positional records, based on pre-defined acceptance criteria.

The use of identity devices on meat and meat products gives the retailers and the end customers complete access to the origin of the meat. The use of obligatory and complete positioning records additionally gives the retailers and the end customers the possibility to personally verify the origin of the animal and meat product answering questions on all locations the animals have been at or passed by as well as times and positions during the production flow, resulting in a market driven product verification process in complement to the rules set up by authorities.

In the following, a prior art production flow is described, from the birth of the animals to ready sausages, and overall for production of meat products, as currently is the situation at many facilities. Embodiments according to the present invention are implemented and further described in the form of electronic tagging and surveillance in each production step in such a way that the production methodology is more or less unchanged.

Prior Art Production Flow From Birth To Slaughter For Cattle

Calves can be of breeds used for milk production or for meat production. Depending on in which environment they are brought up, some of the cow-calves are selected for milk production while practically all bull-calves are bred for meat production. Within their first days the calves are marked with ear tags, one on each ear for the official registration and usually, over time, some more ear tags for identification of the breeders and raisers. The calves intended for meat production are initially raised on the farm of birth and are, at an age of around 3 months, sold and transferred to another farm specialized in breeding the animals until slaughter.

Sales of the animals are administrated through farmer related organizations and slaughter houses and are reported by e-mail and fax by the seller (the procedure is somehow administrative heavy and external consultants are assisting the farmers for a fee).

At arrival the calves are given some medication against diseases and insects, which shall be noted for each individual. They are feed indoors for 3–4 months, later transferred for outdoor-raising for a similar time and finally they are spending the last 3–4 months indoor. In addition to the regular inspections and vaccinations by veterinarians they are inspected daily by the farmer. Based on the individual needs, and upon agreement with the veterinarians, the animals are given medication or other treatments directly by the farmer. The farmers are obliged to report any medical care to the authorities (another step that needs administrative paperwork) on an individual level. The animals are recognized by the identity number of the ear tags and may sometimes be temporarily marked by colors to be easy to locate on a daily basis.

They are individually selected, based on weight or visual inspection of body constitution, for slaughter and sent consecutively, group wise, for slaughter and are loaded on transports to the slaughter facility (abattoir). The reporting has also in this case to be done by the farmer selling the animal for slaughter. After some days the farmer gets the information on weight, quality and payment of the animals from the slaughter facility via a WEB-site.

In an implementation of the method and system according to one embodiment of the present invention, the following operations related to electronic identity and databases can be performed, as depicted in the flowchart of FIG. 2 denoted with roman reference numerals, for the production flow of cattle from birth until slaughter.

I) Birth:
a) The RFID device is injected into the animal in direct relation to the birth. The animal-identity is registered. Breeding information and other ancillary data is stored in the database. For practical reasons, related to obtainable reading distance, the injected RFID device may be complemented by an ear tag containing a separate RFID device bearing the same connection to the animal-identity and the records in the database.

II) Breeding:
(Breeding and raising of the calves during the first months).
b) Cow-calves for milk production are separated and the corresponding information is added to the database.
c) Data is stored in the database in direct connection to any regular or special treatment for logging, for example time, position, disease, treatment, weight, etc.
d) The animal-identity is registered with a reading device in connection to any transfer between facilities at the farm or externally, for example by reading devices in the entrances and exits.

III) Transfer:
(Sales of the animal between the farms and physical transport of the calves to the farm raising the animals until slaughter. Sales transactions are based directly or indirectly on the information and logging of activities in the database).
e) The animal-identity is registered with a reading device at the entrance to the transport.
f) Positions, time and animal-identities are registered continuously during the transport at fixed time intervals, distances or at break-points.
g) The animal-identity is registered with a reading device at the exit of the transport.

h) The sales transaction is performed automatically, with a digital confirmation from the buyer.
i) Data is stored in the database, for example times, positions, vehicle id, seller buyer etc.
j) Data can be retrieved by the seller and the buyer from the database.

IV) Raising:
(The raising of the calves until time of slaughter).
k) Data is stored in the database in direct connection to any regular or special treatment for logging, for example time, position, disease, treatment, weight, etc.
l) The animal-identity may be registered with a reading device in connection to any transfer between facilities at the farm or externally by reading devices in the entrances and exits.

V) Sales:
(Transport of the calves to the slaughter facility, sales and payment of the meat).
m) The animal-identity is registered with a reading device at the entrance to the transport.
n) Positions, time and animal-identities are registered continuously during the transport at fixed time intervals, distances or at break-points.
o) The identity is registered with a reading device at the exit of the transport.
p) The sales transaction is performed automatically, with a digital confirmation from the buyer.
q) Data is stored in the database (such as times, positions, vehicle id, seller, buyer etc.).
r) The seller can retrieve data from the database after slaughter, cutting, etc.

At any point in the procedure relevant data may be uploaded from the active database to an external database, such as databases keeping the official records of the animals on a regional, national or international level.

Prior Art Production Flow From Birth To Slaughter For Pigs

Pigs are born and raised for the first weeks by more or less specialized nurseries. They are tattooed, during the first days of living, with the identity of the breeder, giving special treatment and nutrition. The male piglets are usually castrated. After around three weeks they are sold to farmers specialized in raising the pigs until slaughter (which takes around 6 months). They are transported to the new farm and put in boxes in groups of 6–8 animals, which are kept together for all the time. Practically all feeding is automatic. Individuals with any kind of diseases and/or other problems are put in separate boxes. Any other individuals in need of special attention must be marked with colors or similar, in order to be possible to locate. In connection to transporting to the slaughter facility (abattoir) the pigs are tattooed with the number of the farm.

In an implementation of the method and system according to an embodiment of the present invention, the following operations related to electronic identity and databases can be performed, as schematically depicted in the flowchart of FIG. 3 denoted with roman reference numerals, for the production flow of pigs from birth until slaughter.

I) Birth:
(The piglets are born and initially raised together with their sow for about three weeks after which they are sold and transferred).
a) The RFID device is injected in direct relation to the birth. The animal-identity is registered. Breeding and other ancillary data is stored in the database.
b) Data is stored in the database in direct connection to any regular or special treatment for logging, for example time, position, disease, treatment, weight, castration, etc.).

c) The animal-identity can be registered with a reading device in connection to any transfer between facilities at the farm or externally by reading devices in the entrances and exits.

II) Transfer:

(Sales of the animal between the farms and physical transport of the piglets to the farm raising the animals until slaughter. Sales transactions are based directly or indirectly on the logging of activities in the database).

d) The animal-identity is registered with a reading device at the entrance to the transport.
e) Positions, time and animal-identities are registered continuously during the transport at fixed time intervals, distances or at break-points.
f) The animal-identity is registered with a reading device at the exit of the transport.
g) The sales transaction is performed automatically, with a digital confirmation from the buyer.
h) Data is stored in the database (such as times, positions, vehicle-ID), seller, buyer, etc).
i) Data is retrieved by the buyer from the database.

III) Raising:

(The raising of the pigs until time of slaughter).

j) Data is stored in the database in direct connection to any regular or special treatment for logging, for example time, position, treatment, weight, etc.).
k) The animal-identity may be registered with a reading device in connection to any transfer between facilities at the farm or externally by reading devices in the entrances and exits.

IV) Sales:

(Transport of the pigs to the slaughter facility, sales and payment of the meat).

l) The animal-identity is registered with a reading device at the entrance to the transport.
s) Positions, time and animal-identities are registered continuously during the transport at fixed time intervals, distances or at break-points.
m) The animal-identity is registered with a reading device at the exit of the transport.
n) The sales transaction is performed automatically, with a digital confirmation from the buyer.
o) Data is stored in the database (such as times, positions, vehicle-ID, seller buyer, etc.).
p) Data is retrieved by the seller from the database, after slaughter, cutting, etc.

At any point in the procedure relevant data may be uploaded from the active database to an external database, such as databases keeping the official records of the animals on a regional, national or international level.

Examples Of RFID Tag Requisites For Farming Implementation

Alternative A, (tags that can be implanted)

The tags can be implanted by veterinary doctors or farmers, for instance into the muscles in the neck of the animals.

The tags can either be readable at short range (some decimeters) or at longer range, 3–4 meters. If, in the latter case, internal power is used the life length in one case is at least 6 months and in another case at least 30 months.

Only ID is required.

Preferably world unique id numbers are employed.

The tags are readable with commercially available equipment.

The tags are compatible with any existing standard.

Alternative B, (Ear tags)

The readable tags can be integrated in existing ear plastic tags.

The tags are readable at a range of at least 3 meters.

Only ID is required.

Preferably world unique id numbers are employed.

The tags are readable with commercially available equipment.

The tags have very high capabilities to withstand the tough conditions.

Examples Of Tag Reading System Requisites For Farming Implementation

Alternative A, (fixed systems)

Reading of identity from one or both of the alternatives a) and b) of RFID tags for farming.

Antenna systems capable to tune into a "curtain" with about 3–4 meters range and about 2–3 meters width.

Reading system capable of being transformed for using multiple tag technologies, multiple frequencies.

Local data storage is available in case of any problems with local transmission.

On-line connection to a GSM-module for forward transmission of information (other cellular radio technologies or WLAN solutions may also be used).

Anti-collision for at least one hundred of simultaneous readings.

Reading and storage of data can be limited to the ID solely. For transmission also the ID of the reading station is included.

Rugged for (a) humid indoor environments with temperatures ranging from about +/0 to +30 degrees Celsius, (b) outdoor environments for temperatures between −30 to +40 degrees Celsius and functional during rain, wet snow and dry snow.

Alternative B, (hand-held system)

Hand-held integrated reading device including antenna, storage and transmission capabilities.

Reading range is some decimeters.

Preferably including GPS, or possible to integrate with GPS.

In addition to tag ID, the following information can be stored and transmitted; (a) ID of operator confirmed by a pin-code, (b) action as entered in via a keyboard or similar, (c) ID of equipment, (d) location.

Reading system capable of being transformed for using multiple tag technologies, multiple frequencies.

Local data storage available.

Uploading to database via connection to Internet through mobile or fixed devices. No requirement on permanent on-line connection, for instance automatic uploading in connection to charging is possible.

Read one tag at the time only.

Tamper-proof.

Rugged for indoor and outdoor environments for temperatures ranging between −30 to +40 degrees Celsius and functional during rain, wet snow and dry snow.

Battery capacity for at least one days work.

Alternative C, (animal transport)

As alternative A but:

Possible to attach on the gate of an animal transport lorry.

Possible to integrate with either a dynamic GPS receiver or the navigation system of the vehicle.

Anti-collision for tens of simultaneous readings.

Reading, storage and transmission of data including RFID, position, and vehicle ID.

Prior Art Flow Of Production From Slaughter To Primal Cuts For Cattle

At arrival to the slaughter facility (abattoir) the cattle's are carrying numbered ear tags. Each number corresponds to a record in the central database at the national agriculture authority. The database can be downloaded and accessed externally. An animal that have any problems with the ear tag (such as a lost tag, different tags on the ears, tags not corresponding to the right breeder, or even country of origin, etc) is taken aside and the farmer gets 24 hours to correct the problem properly, if not the animal will be killed and destroyed. The ear tags are removed in direct connection to the slaughter and later destroyed. The number is entered, manually, and the corresponding database record is collected up from the database. A new barcode based label is printed and attached to the body, replacing the ear tag. Some text information is directly available on the barcode label.

After the animal has been slaughtered, unloaded, bled and hung on a rail system the barcode is read and the carcass is cut into quarters. New barcode labels are printed for each quarter. The quarters are quality classified through visual inspection. Automatic classification methods are very tricky concerning beef, under for instance Swedish circumstances, as the cattle is very heterogeneous ranging from milk cows to different breeds for meat production. At the next station the 4 quarters are divided into primal and sub-primal cuts - about two for each fore quarter and eight for each hind quarter - and a new set of labels are attached to each piece before packaging. Secondary pieces of meat are classified into two-three classes for production of ground meat and processed meat products and are time labelled, i.e. only an approximate identity is maintained.

(An alternative approach used by smaller abattoirs is to keep all cuts from an animal, or quarter of animal, together after the primal cutting. However this requires approximately a doubled physical space for the activities due to the high number of boxes used.)

Primal and sub primal cuts are vacuum-packed with labels both inside and outside the plastic cover. They are put into boxes and delivered to the shops via a computerized and robotized distribution system. The total meat production of an animal can be retrieved from the databases and thus becomes the bases for payments.

In an implementation of the method and system, according to one embodiment of the present invention, the following operations related to electronic identity and databases can be performed, as schematically depicted in the flowchart of FIG. 4 denoted with roman reference numerals, for the production flow of cattle from slaughter to primal cuts, packaging and delivery.

I) Arrival:
(The cattle arrive and are transferred to a temporary stable).

a) Positions, time and animal-identities are registered continuously during the transport at fixed time intervals, distances or at break-points.

b) The animal-identity is registered with a reading device at the exit of the transport.

c) The animal-identity is registered with a reading device at the entrance of the slaughter facility.

d) Any external data, such as from official records kept by regional, national or international authorities, is downloaded to the active database.

II) Slaughter:
(The cattle are moved from the temporary stable to the killing box, killed and hanged on transport system).

e) The animal-identity is registered with a reading device in direct connection to the slaughter, for example in connection to the gate of the killing box.

f) Data on the cattle is checked right before the killing.

g) The body is hanged on a rail system and a new RFID device is attached to the carcass after slaughter, unloading and bleeding.

h) The new RFID device is connected to the animal-identity and its database records.

i) New data is added to the database (such as time, position, hot body weight, and new and replaced RFID devices).

III) Quartering:
(The carcass is moved along the transport system to the quartering station, where it is quartered, quality classified and reloaded on a transport system).

j) The animal-identity is registered with a reading device right before the quartering.

k) New RFID devices are attached to each quarter.

l) The new RFID device is connected to the animal-identity and its database records.

m) New data is added to the database (such as time, position, quality, weight of the quarters, and new and replaced RFID devices).

IV) Cutting:
(The quarters are moved along the transport system to the cutting station and are cut into primal and sub-primal cuts).

n) The animal-identity is registered with a reading device right before the cutting.

o) New RFID devices are attached to each cut.

p) The new RFID device is connected to the animal-identity and its database records.

q) Sales and payment transactions are performed based on the value of the cuts according to the database.

r) New data is added to the database (such as time, position and weight of the primal and sub-primal cuts, and new and replaced RFID devices).

V) Packing:
(The cuts are packaged, sorted into boxes and stored in storage rooms).

s) The identities of the individual cuts are registered with a reading device in connection to the packing.

t) New RFID devices are attached to each box, possibly being smart tags also having data storage capacity.

u) The new RFID device is connected to the animal-identity and its database records.

v) The identity of the boxes is registered with a reading device when passing between and into storage departments.

w) New data is stored in the database, and if applicable also in the smart tags (such as time, position, content and weight of boxes and new and replaced RFID devices).

VI) Delivery:
(The boxes are picked out of the storage and loaded on the trucks for delivery to the destination).

x) The identity is registered with a reading device at the exit of the storage facility:

y) The identity is registered with a reading device at the loading of the transport.
z) Positions, time and identities are registered continuously during the transport at fixed time intervals, distances or at break-points.
aa) The identity is registered with a reading device at the unloading of the transport.
bb) The identity is registered with a reading device at the entrance to the wholesaler or retailer facility.
cc) The sales transaction is performed automatically, with a digital confirmation from the buyer.
dd) New data is added to the database (such as times, positions, vehicle-ID, seller, buyer, etc).
ee) Data is exported and made accessible to any external users, such as retailers.

As in all examples, the exact procedure will be dependent on the construction and production flow of the actual production facility. Reading of existing and attachment of new RFID devices for step III) Quartering and step IV) Cutting may for instance be done in one step. Input of data to the active database can in principle be performed anywhere along the production flow.

Prior Art Flow Of Production From Slaughter To Primal Cuts For Pigs

The traceability of meat is currently less advanced for pigs (as well as for sheep) than for cattle. Before entering the transport from the farm, the pigs are tattooed on the left and right side with unique ID numbers (likely without checking the tattoo from when they are born, which is often not any longer fully visible). After slaughter and in connection to the cutting of the pig into two halves these ID numbers are replaced with new codes that are stamped on each halve. The halves are classified manually by making fat estimations through making measurements by stitching at two points. The result is stamped on the halves. Image analysis methodologies for fully automatic classification of pig meat, based on such criteria as form and color, have been developed and are now also taken into production at certain facilities. In connection to the division into primal and sub-primal cuts, barcode labels are printed for the pieces of cuts and attached. The origin of the meat is traceable down to the number tattooed on the individual in connection to the loading of the animal transport at the farm, but not to any individual animal data. Meat for production of processed products can be traced, to a limited degree, through time logs.

In an implementation of the method and system, according to one embodiment of the present invention, the following operations related to electronic identity and databases can be performed, as schematically depicted in the flowchart of FIG. 5 denoted with roman reference numerals, for the production flow of pigs from slaughter to primal cuts, packaging and delivery.

I) Arrival:
(The pig arrives and is, after off-loading the transport, transferred towards the killing space where it is killed and hanged onto the transport line).
a) Positions, time and animal-identities are registered continuously during the transport at fixed time intervals, distances or at break-points.
b) The animal-identity is registered with a reading device at the exit of the transport.
c) At the entrance of the slaughter facility, the animal-identity is registered with a reading device.
d) Any external data is downloaded to the active database.

II) Slaughter:
(The pig is moved into the killing space and slaughtered).
e) The animal-identity is registered with a reading device in direct connection to the slaughter, for example in the opening to the killing space.
f) Data on the pig is checked right before the killing.
g) The body is hanged on a rail system and a new RFID device is attached to each halves of the body after slaughter, unloading, bleeding and halving, but before the quality classification).
h) The new RFID devices are connected to the animal-identity and its database records.
i) New data is added to the database (such as time, position, weight of the halves, quality classification, and new and replaced RFID devices).

III) Cutting:
(The halves are moved along the transport system to the cutting station and are cut into primal and sub-primal cuts, which are partly sorted and put on conveyor belts).
j) The identity is registered with a reading device right before the cutting.
k) New RFID devices are attached to each cut.
l) The new RFID devices are connected to the animal-identity and its database records.
m) Sales and payment transactions are performed based on the value of the cuts according to the database.
n) New data is added to the database (such as time, position, weight of the primal and sub-primal cuts, and new and replaced RFID devices).

IV) Packing:
(The cuts are packaged, sorted into boxes and stored in storage rooms).
o) The identities of the individual cuts are registered with a reading device in connection to the packing.
p) New RFID devices are attached to each box, possibly being small tags also having data storage capacity.
q) The new RFID devices are connected to the animal-identity and its database records.
r) The identity of the boxes is registered with a reading device when passing between and into storage departments.
s) New data is stored in the database, and if applicable also in the small tags (such as time, position, content and weight of boxes and new and replaced RFID devices).

V) Delivery:
(The boxes are picked out of the storage and loaded on trucks for delivery to the destination).
t) The identity is registered with a reading device at the loading of the transport.
u) Positions, time and box-identities are registered continuously during the transport at fixed time intervals, distances or at break-points.
v) The identity is registered with a reading device at the unloading of the transport.
w) The identity is registered with a reading device at the entrance to the wholesaler or retailer facility.
x) The sales transaction is performed automatically, with a digital confirmation from the buyer.
y) New data is added to the database (such as times, positions, vehicle-ID, seller, buyer).
z) Data is exported and made accessible to any external users, such as retailers.

Examples Of RFID Tag Requisites For Industry Implementation

Tags are attachable to meat, meat cuts and meat products for one-time use, preferably being flat and thin of the size of a credit card or barcode tag.

The tags are readable at about 1-2 meters range.

The tags are functional in temperatures between −5 to +95 degrees Celsius.

Only ID is required.

World unique id numbers are not an absolute requirement.

Readable with commercially available equipment.

Possible to read manually upon failure (through printed text or barcode).

Compatible with existing standards.

Examples Of Tag Reading System Requisites For Industry Implementation

Alternative A, (fixed systems)

Reading of identity from RFID tags for industry.

In addition preferably capable of reading identity from RFID tags for packaging and batch handling.

Antenna system possible to direct with an opening of 30–90 degrees and a reading range of about 1–2 meters or alternatively capable to tune into a "curtain" with about 1–2 meters range and about 1–2 meters width.

Reading system capable of being transformed for using multiple tag technologies, multiple frequencies.

On-line connection via LAN or WLAN.

Anti-collision for tens of simultaneous readings.

Possible to mount and maintain in an industrial environment.

In addition to tag ID, the following information is at certain stations possible to register and forward to the database; (a) ID of operator confirmed by a pin-code, (b) action as entered in via a keyboard or similar, (c) ID of equipment(s), which may be entered via a keyboard on an ordinary PC.

Alternative B, (product transport)

As alternative A but:

Possible to attach on the gate of a transport vehicle.

Antenna systems capable to tune into a "curtain" with about 3–4 meters range and about 2–3 meters width.

Possible to integrate with either a dynamic GPS receiver or the navigation system of the vehicle.

On-line connection to a GSM-module for forward transmission of information (other cellular radio technologies may also be used).

Local data storage is available in case of any problems with local transmission.

Reading, storage and transmission of data including RFID, position, and vehicle ID.

Prior Art Production Flow At A Sausage Production Facility

Meat from beef in two basic qualities (typically 10% and 23% fat) and from pigs in two basic qualities (typically 17% and 26% fat) as well as lot of different qualities, are arriving in batches of about 400 kg. The containers are marked with identification of the slaughter facility (abattoir) and date of slaughter through tags including barcode through which a piece of meat may be possible to trace back with a precision of a number of alternative farmers. The meat is stored in the original container until minced. The minced meat is stored in steel containers of the same size and are tagged with information about day of mincing, i.e, still maintaining a, gradually blurred, degree of traceability. The minced meat is mixed with ice, salt, etc, and sorted into strictly standardized sausage meat qualities as well as some special qualities. As a part of the processing the fat content is measured and lean meat or fat is added in order to obtain the correct degree of fat. The sausage meat is tagged with day of processing and can be stored up to a week as practically all microbiologic activities has been halted. The traceability is thus further reduced but it is still possible on a number of farmers level, based on the date of marking. In the next step the correct mix of sausage meat is measured, mixed, and processed together with spices and transported to the cramming machine. The sausages are hanged on carriers and moved into smoke chambers in batches of, typically 5–8 carriers. The smoking process typically takes about 20–40 minutes and gives a temperature to the sausages of around 72 degrees Celsius. The weights of the carriers, including the sausages, are measured before and after the smoking process. Neither the carriers nor the sausages do have any specific identifiers. After the smoking the sausages are cooled, packed individually and in boxes for transport to the retailers. The boxes are marked with tags including barcode, showing the date of production and the identity of the producer.

In an implementation of the method and system, according to one embodiment of the present invention, the following operations related to electronic identity and databases can be performed, as schematically depicted in the flowchart of FIG. 6 denoted with roman reference numerals, for the production flow of meat to sausages.

I) Arrival:

(The meat arrives in batches and is put into storage rooms).

a) Positions, time and identities are registered continuously during the transport at fixed time intervals, distances or at break-points.

b) The identity is registered with a reading device at the exit of the transport.

c) The RFID device, holding the batch identity, which is attached to the transport box, is registered with a reading device at the entrance to building. The batch identity can be connected back to the individual identities of the animals through the database records.

d) The batch identity is registered with a reading device at the entrance to the storage facility.

e) Any external data is downloaded to the active database and new data is added (such as time, position, weight and quality confirmation).

II) Mincing:

(The batches of meat are moved from the storage facility and minced).

f) The batch identity is registered with a reading device at the exit of the storage facility.

g) The batch identity is registered with a reading device just before mincing.

h) The meat is scanned for any lost RFID device or other unwanted object just before mincing.

i) New data is added to the database (such as time, metal detection verification, mincing device and position).

j) The RFID device at the outgoing transport box is given a new batch identity.

k) Data is stored in the database for the new batch identity (such as time, quality, mincing device and position).

III) Processing:

(The batches of minced meat are processed into sausage meat by well defined qualities).

l) The batch identity is registered with a reading device just before processing.

m) Data is stored in the database (such as time, position and identities of incoming container).

n) The RFID device at the outgoing transport box is given a new batch identity.
o) Data is stored in the database for the new batch identity (such as time, quality, processing device and position).
p) The batch identity is registered with a reading device at the entrance to the storage facility.

IV) Mixing:
(The sausage meat is mixed in the right proportions, lard and spices are added and are processed into ready sausage meat, which are transferred into the cramming system).
q) The batch identities of the sausage meat containers are registered with a reading device at the exit of the storage facility.
r) The batch identities of the sausage meat containers are registered with a reading device in connection to entering the mixing and processing machine.
s) Data is stored in the database (such as time, position and identities of incoming container).
t) The RFID device at the outgoing container is given a new batch identity.
u) Data is stored in the database for the new batch identity (such as time, position, identities of incoming containers, processing device and proportions of mixed ingredients).

V) Cramming:
(The sausage meat is moved in pipelines or similar into the cramming machines. The sausages are hanged on carriers).
v) The batch identities of the ready mix of sausage meat containers are registered with a reading device in connection to input into the cramming system.
w) Data is stored in the database (such as time, position and identities of incoming container).
x) The RFID device at the carriers with newly crammed sausages is given a new batch identity.
y) Data is stored in the database (such as time and position).

VI) Smoking:
(The carriers with sausages are smoked in a smoke-room. They are weighed before and after the smoking).
z) The batch identities of the carriers are registered with a reading device in connection to weighing before smoking.
aa) Data is stored in the database (such as time, position and pre-smoking weight).
bb) The batch identities of the carriers are registered with a reading device at entrance and/or exit to the smoking rooms.
cc) The batch identities of the carriers are registered with a reading device in connection to weighing after smoking.
dd) Data is stored in the database (such as time, position and post-smoking weight).

VII) Packing:
(The carriers are moved to the packing machines where the sausages are vacuum packed and put into boxes).
ee) The batch identities of the carriers are registered with a reading device in connection to the packing.
ff) New RFID devices are attached to each package and box of sausages, possibly being small tags also having data storage capacity.
gg) The identities of the packages and boxes are registered with a reading device in connection to storage.
hh) Data is stored in the database (such as time, position, number, weight and type).

VIII) Delivery:
(The packages are moved from the storage to the trucks for transport to retailers and shops).
ii) The identities of the packages and boxes are registered with a reading device in connection to leaving the storage.
jj) The identities of the packages and boxes are registered with a reading device when entering the transport vehicle.
kk) Position and time are registered continuously during the transport at fixed time intervals, distances or at break-points.
ll) The identity is registered with a reading device at the unloading of the transport.
mm) The identity is registered with a reading device at the entrance to the wholesaler or retailer facility.
nn) Data is stored in the database (such as time and position).
oo) Data is exported and made accessible to any external users, such as retailers.

Examples Of RFID Tag Requisites For Batch Handling Implementation

Tags are attachable to containers of stainless steel used for, for instance, cuts of meat or minced meat.
Intended for permanent use.
Are easily exchangeable if failing or as part of regular maintenance.
The tags are readable at a range of about 3 meters.
The tags can function in temperatures between −30 to +95 degrees Celsius.
Only ID is generally required but re-writeable tags can be employed.
World unique id numbers are not an absolute requirement.
Readable with commercially available equipment.
Failing RFID devices are easy to detect automatically.
Compatible with existing standards.

Examples Of Tag Reading System Requisites For Batch Handling Implementation

Alternative A, (fixed systems)
Reading of identity from RFID tags for batch handling.
In addition preferably capable of reading the identity from RFID tags for industry and packaging.
Antenna systems capable to tune into a "curtain" with about 3–4 meters range and about 2–3 meters width.
Reading system capable of being transformed for using multiple tag technologies, multiple frequencies.
On-line connection via LAN or WLAN.
Anti-collision for tens of simultaneous readings.
Possible to mount and maintain in an industrial environment.
In addition to tag ID, the following information is at certain stations possible to register and forward to the database; (a) ID of operator confirmed by a pin-code, (b) action as entered in via a keyboard or similar, (c) ID of equipment(s), which can be entered via a keyboard on an ordinary PC.

Alternative B, (product transport)
As alternative A but:
Possible to attach on the gate of a transport vehicle.
Antenna systems capable to tune into a "curtain" with about 3–4 meters range and about 2–3 meters width.
Possible to integrate with either a dynamic GPS receiver or the navigation system of the vehicle.
On-line connection to a GSM-module for forward transmission of information (other cellular radio technologies may also be used).

Local data storage is available in case of any problems with local transmission.

Reading, storage and transmission of data including RFID, position, and vehicle ID.

Prior art Distribution Flow For Meat And Meat Products From Producer To Customer Via Wholesaler At the facility of the producer of ready meat products, boxes containing packages with ready products, such as sausages, minced meat and smoked ham, are picked up from the cooled storage room in accordance with orders sent by fax, e-mail, telephone etc. They are moved into transport vehicles, which transport them, according to a scheme based on the location of the buyers. The buyers can in principle be both wholesale distributors and larger supermarkets.

At delivery to the wholesaler the goods are unloaded from the transport vehicle and moved into the cooled storage room where it is stored until ordered by a retailer. Upon order it is collected from the storage room and moved to the transport vehicle for transport to the retailer by specialized transport companies or sometimes by the retailer themselves. At the retailer store the boxes are unloaded from the transport vehicle and, usually moved into a cooling room, from which it is later picked up, opened and the content is loaded on a shelf or similar for the end-customer to select from at time of purchase. The final customer picks up the goods, put it in a wagon, basket or similar, unload it in connection to the cashier, where the goods are paid for and put in, for instance, plastic bags, before taken away for consumption by the end customer.

In an implementation of the method and system, according to one embodiment of the present invention, the following operations related to electronic identity and databases can be performed, as schematically depicted in the flowchart of FIG. 7 denoted with roman reference numerals, for the distribution of meat and meat products from the industry to a consumer, via wholesaler and retailer:

I) Transport (to Wholesaler):
(The boxes of meat or meat products are loaded into a vehicle and transported to the wholesaler).
a) The box-identity is registered with a reading device at the exit of the production facility for meat or meat products.
b) Positions, time and box-identity are registered continuously during the transport at fixed time intervals, distances or at break-points.
c) The box-identity is registered with a reading device at the exit of the transport.
d) New data is added to the database concerning the transport (such as times, positions, box-identities, etc).
e) At the entrance to the wholesaler, the box-identity is registered with a reading device.
f) The sales transaction is performed automatically, with a digital confirmation from the buyer.
g) At unloading at the storage room the box-identity is registered with a reading device, including time and its actual position in the storage room (the latter may be used for control of age and amount of stored products as a part of a storage management system).
h) New data is added to the database (such as times, positions, box-identities, buyer, etc).
i) The buyer downloads any required data from the database about the content of the boxes for logging and check. Alternatively, when an Internet connection is not used and when smart tags containing data is used on the boxes, the information about the content is retrieved directly from the smart tags of the boxes.

II) Transport (to Retailer).
(Based on an order from retailers the boxes of meat or meat products are picked up from the storage room loaded into a vehicle and transported to the retailer.).
j) The box-identity is registered with a reading device at the exit of the wholesalers facility.
k) Positions, time and box-identity are registered continuously during the transport at fixed time intervals, distances or at break-points.
l) The box-identity is registered with a reading device at the exit of the transport.
m) New data is added to the database concerning the transport (such as times, positions, box-identities, etc).
n) At the entrance to the retailer, the box-identity is registered with a reading device.
o) The sales transaction is performed automatically, with a digital confirmation from the buyer.
p) At unloading at the storage room the box-identity is registered with a reading device, including time and its actual position in the storage room (the latter may be used for control of age and amount of stored products as a part of a storage management system).
q) New data is added to the database concerning the transport (such as times, positions, box-identities, etc).

III) Unpacking:
(The boxes are unpacked and the items of the boxes are put into, for instance, the shelf).
r) The box-identity is registered with a reading device, when picked out of the storage room.
s) At unpacking of the box into single items the box-identity and the item-identities are registered (the item-identities for a box is available both on the RFID devices of the items, downloadable in the database connected the box-identification and, when applicable, as data stored in the smart-tag of the box).

IV) Purchase:
(The items are selected by the end customer, purchased and taken away for consumption).
t) The item-identities can be registered with a reading device at information machines, before the purchase, which present all requested data for the customers from stored data retrieved at the retailer facility or through a direct Internet connection.
u) The item-identities are registered with a reading device at the exit of the purchase area (in connection to the cashier) and can be used as a part of an automatic purchase registration system.
v) The item-registration number is printed on the receipt and can be used later by the buyer for retrieving data about the item via Internet.

Examples Of RFID Tag Requisites For Packaging Implementation:

Alternative A, (per piece tags)

Tags are attachable to packed pieces of meat or retailer packed products. Preferably the tags are flat and thin and printable with text and barcode information.

The tags are readable at a range of about one meter.

The tags can function in temperatures ranging between −30 to +95 degrees Celsius.

Only ID is required.

Preferably world unique id numbers.

Readable with commercially available equipment.

Compatible with existing standards.

Alternative B, (pet box small tags).
As alternative A but:

In addition to ID it should be once-only writeable with several hundreds of bits information which is tamper proof.

Preferably readable with the same equipment as alternative A.

Examples Of Tag Reading System Requisites For Packaging Implementation:

Alternative A, (fixed systems)

Reading of identity from one or both of the alternatives a) and b) of RFID tags for packaging.

In addition preferably reading of identity from RFID tags for industry and batch handling.

Antenna system possible to direct with an opening of 60–120 degrees and a reading range of up to one meter.

Reading system capable of being transformed for using multiple tag technologies, multiple frequencies.

Anti-collision for some tens of devices, which are separable by distance and type of device.

Can be used in conventional office environment or cooling and freezing rooms.

Can be integrated with other equipment via WLAN, LAN or standard interfaces.

Alternative B, (product transport)

As alternative A but:

Possible to attach on the gate of a transport vehicle.

Antenna systems capable to tune into a "curtain" with about 3–4 meters range and about 2–3 meters width.

Possible to integrate with either a dynamic GPS receiver or the navigation system of the vehicle.

On-line connection to a GSM-module for forward transmission of information (other cellular radio technologies may also be used).

Local data storage is available in case of any problems with local transmission.

Anti-collision for tens of simultaneous readings.

Reading, storage and transmission of data including RFID, position, and vehicle ID.

Prior Art Flow Of Events For A Interchanging Of Cattle

Below is a prior art example where a co-operative organization in the UK is assisting the farmers with the sales and transport of very young calves. The operations are performed at an interchange facility to which the calves are physically transported for selection according to requests from buyers and later delivery to the new owners.

The calves arrive at an age of a minimum of 7 days and they may be some weeks older. At the entrance all ear tags are registered on paper form and matched to the individual animals paper passports. A temporary collar with a three-figure number is attached to each of the calves and matched to the official ID. This is done of the simple reason that a short number is much easier to handle than the long official ID. The collars are removed when the calves later leave the facility and are thus also used as an internal check of which animals that have been moved onto the transport vehicles. At the office of the facility the ownership is noted either in the passport or in a temporary form, which is allowed to be used instead of the passport until 4 weeks after the birth of the calves. There are two ownership transfers made during the interchange, one from the farmer to the facility itself, which then resells the animal within the same or the next day (for distant transports an overnight rest is given to the animal) and one for the new owners.

At the entrance to the stables of the interchange facility the calves are passing via a weighing box where they are classified into typically six classes. They are sorted according to requests by the buyers, which are made at least the week before (the entire transactions are planned for one week at the time from starting Tuesday ending on Monday). Unsuitable animals are sorted out (such as for instance having a navel rupture) and are killed or returned to the seller. The animals are sorted into boxes according to the buyers requests concerning, breed, quality, etc. A representative concerning animal treatment working for an authority is present all the time. The passports of the sorted animals are filed in with the data of the new buyers. The transfer of ownership is registered into the passports and is followed by reporting into a central database through manual typing. Vehicles deliver the animals to the new owners in the afternoon after proper cleaning and disinfections. Often the calves are brought up by, so called, Rearers, for about three month before being finally sold to the Farmers who keep them until slaughter, the Finalisers. The Rearers are guaranteed a sell back of the animals by the interchange facility through the farmers co-operative. The administrative work is handled by the Interchange facility on behalf of the Farmers.

In an implementation of the method and system according to one embodiment of the present invention, the following operations related to electronic identity and databases can be performed, as depicted in the flowchart of FIG. 8 denoted with roman reference numerals, for the flow of events for an interchanging of cattle.

I) Arrival:
  (The calves arrive and exit the transport vehicles and enter into the interchange . facility).
  a) Positions, time and animal-identities are registered continuously during the transport at fixed time intervals, distances or at break-points.
  b) The animal-identity is registered with a reading device at the exit of the transport.
  c) The animal-identity is registered at the entrance to the interchange facility.
  d) Any external data, such as from an official ownership database, is downloaded to the active database.

II) Registration and weighing:
  (The calves are moved into a box for weighing, classification).
  e) The animal-identity is registered at the entrance to the weighing box.
  f) The cattle are weighed, inspected and graded into quality classes and, in cases, sorted out as unusable for return or killing and destruction. For each animal data such as animal-identity, position, weight, grading and, possible, return or killing and destruction is stored in the database.
  g) The animal-identity is registered at the exit of the weighing box and at all relevant gates.
  h) The transfer of ownership (to the interchange facility) or possible return or killing and destruction is reported and uploaded to the official database.

III) Sorting:
  (Buyers are selected for each animal according to their requirements).
  i) The cattle are sorted into boxes in correspondence with selected buyers. The animal- identity and position is registered at the entrance of each box.

j) Data is stored in the database (such as times, positions, buyers, etc.).

IV) Loading:
(The animals are moved from the boxes ownerwise and loaded into the transport).
k) The animal-identity is registered at the exit of the box used for sorting and at the exit of the interchange facility.
l) Data is stored in the database, for example times, positions, vehicle id, etc.
m) The transfer of ownership (to the new owner) is reported and uploaded to the official database.

V) Delivery:
(The animals are transported to the new owners).
n) The identity is registered at the entrance to the transport.
o) Positions, time and animal-identities are registered continuously during the transport at fixed time intervals, distances or at break-points.
p) The identity is registered at the exit of the transport.
q) Data is stored in the database, for example times, positions, vehicle id, etc.

Prior Art Flow Of Events From Rearer To Finisher For A Cattle Auctioning

The main day for a live auction is Friday. The farmers, delivering the livestock has to report their upcoming deliveries to the auctions by email, fax or phone latest Wednesday the same week. During Thursday, the day before the auction, the catalog is printed and made available via Internet. At arrival the cattle is registered by checking the ID numbers of the cattle with the passports manually, which is followed by scanning of the identification barcodes of the passport into the computer at the office facility. The cattle are moved to boxes, maintaining that the cattle from each individual farmer still stay together. In the boxes they are available for the buyers for inspection.

At the time of auctioning the cattle from a specific farmer are transferred through a number of gates and are sorted and separated into groups of one or a few individuals with similar properties, i.e. breed, weight, grade, etc. The cattle of each farmer expected to have the highest value are moved into the auctioning room and following from the same farmers sequentially are cattle of expected lower value. Using the identities of the ear tags, the information of each cattle is shown on a large electronic board simultaneously as the cattle are entering the auction room. The auctioning is then performed and afterwards, at the exit, the animals are marked with the identity of the buyer with a simple collar or a color dot. The animals are moved into boxes corresponding to the buyers and are later, usually on the same day, put on a transport for delivery to the buyers.

A very similar procedure is applied for example for sheep.

In an implementation of the method and system according to one embodiment of the present invention, the following operations related to electronic identity and databases can be performed, as depicted in the flowchart of FIG. 9 denoted with roman reference numerals, for the flow of events from Rearer to Finisher at a cattle auctioning:

I) Arrival:
(The cattle arrive, enter into the auction facility and are put into boxes sorted by owner):
a) The animal-identity is registered at the entrance to the transport.
b) Positions, time and animal-identities are registered continuously during the transport at fixed time intervals, distances or at break-points.
c) The animal-identity is registered with a reading device at the exit of the transport.
d) The animal-identity is registered at the entrance to the auction facility and may be registered while passing other appropriate gates.
e) The animals are put in boxes. The animal-identities are registered at the entrance of the box.
f) Data is stored in the database for each animal, for example times, positions, vehicle id, box id, etc.
g) Any external data, such as from an official ownership database, is downloaded to the active database.
h) The transfer of ownership to the auctioning organization is reported to the official database.

II) Pre-sorting:
(The cattle are moved from the boxes toward the auctioning room and are sorted in small batches of one or a few animals of similar properties before entering the auction room).
i) The animal-identities are registered at the exit of the box.
j) The animal-identities are registered at the entry of the area of gates and boxes used for sorting in connection to the auctioning hall and may be registered while passing other appropriate gates.
k) The animals are sorted and enter the box direct in connection to the auctioning room. The animal-identity is registered.
l) Data for each animal is stored in the database, for example times, positions, gate IDs, etc.

III) Auctioning:
(As the cattle enter the auction room, the data of each animal is shown at the electronic board, the auction is carried out and the new owners are registered).
m) The animal-identities for the entire group of animals are registered at the entrance of auction room (in case of, for instance, sheep, the number of animals entering through the gate are registered and read by the RFID simultaneously may be several tens of animals).
n) The relevant data is read from the database and instantly displayed on the electronic board.
o) The auction is carried out. Data is stored in the database for each individual and group of individuals concerning price, new owner, times, positions, gate IDs, etc.
p) The animal-identity is registered at the exit of the auction room and may be registered while passing other appropriate gates.
q) Each animal is marked for the new owner and moved to a corresponding box where the animal-identity is read at entrance.
r) Data is stored in the database, such as times, positions, box-IDs, etc.

IV) Loading:
(The animals are moved from the boxes by owners and loaded into the transport).
s) The animal-identity is registered at the exit of box used for sorting and at the exit of the auctioning facility and may be registered while passing other appropriate gates.
t) Data is stored in the database, for example times, positions, vehicle id, etc.
u) The transfer of ownership to the new owner is reported to the official database.

V) Delivery:
(The animals are transported to the new owners).
v) The animal-identity is registered at the entrance to the transport.
w) Positions, time and animal-identities are registered continuously during the transport at fixed time intervals, distances or at break-points.

x) The animal-identity is registered at the exit of the transport.
y) Data is stored in the database, for example times, positions, vehicle id, etc.

FIG. 10 schematically depicts a system according to an embodiment of the invention for monitoring, controlling and authenticating quality and origin of animals from birth through slaughter and to packaged meat products by means of electronic tags, electronic surveillance and positioning of livestock, meat and meat products via a network of connected databases, position determining means and communication through networks for data and telecommunication. Throughout the chain of events beginning with the birth of an animal leading to a meat product for sale on a market shelf, tags are continuously and wirelessly providing positioning data with a timestamp to a location in a connected database in accordance with identification codes in the tags and through identification code receivers connected to position determining means and time determining means, registering the data in code-corresponding database locations.

From birth of the animals, through the slaughter, cutting and manufacturing process, the quality of the animals, meat and products can be controlled and monitored additionally, according to one embodiment of the present invention, by using continuous records of the temperature surrounding or prevailing in the animal or product. Such temperature records can be obtained by using RFID devices with built-in temperature measurement capabilities. An RFID device for temperature measurements can be used for identification of animals, carcasses, pieces of meat, batches of meat, intermediate products and the final meat and meat products or used in addition to the RFID device used for identification for the purpose of temperature measurements only. Through the continuous use of RFID devices with temperature measurement capabilities and through a corresponding reporting and logging of the temperature in the database location corresponding to identification code for animals, meat and meat products, an unbroken chain of regular temperature measurements, which can be used for approving the utilization of the animals, meat and meat products for final consumption, are obtained.

Through the use of RFID devices in combination with a reading system or identification code receiver in connection with a position and time determining means, which can calculate and report distance and/or direction to the RFID device at each occasion, according to another embodiment of the invention, the exact location of a RFID device can be calculated geodetically through using two or more sychronized reading systems at regular intervals, thus obtaining direct records of each animals or items movements within the limits of the antennas. This methodology may be used within animal stable environments where the possible mixing of animals of different origin shall be controlled or within manufacturing and storage environments for logging continuous time and position records of, for instance, batches of meat and meat products.

One embodiment of the present invention comprises that registrations of animal positioning data in the database are numerically compared with registered positions of alarms concerning diseases, unauthorized food content, contamination, or the like, for notifications in the database constituting possible hindrances for allowing distributing animals, meat or meat products to a market if the positioning data are found matching or close to matching according to a predetermined threshold for the positioning data.

Communication means can be a transponder or the like means for transmitting the code of a tag to a receiver.

Authorizing means can be software and/or an algorithm for determining animal, meat and product quality out of database information, or be provided by a manual check in the database for quality determination.

Data inputting means can be a keyboard, touch-pad, speech recognition interface or any other known input means.

Tag scanning means can be any tag reader available on the market, such as for reading RFID tags, barcodes or the like.

Means mentioned in the present description can be software means, hardware means or a combination of both.

The present invention has been described with non-limiting examples and embodiments. It is the attached set of claims that describe all possible embodiments for a person skilled in the art.

What is claimed is:

1. A method for controlling and authenticating quality and origin by means of electronic tagging, electronic surveillance and positioning of livestock, meat and meat products via networks for data and telecommunication and position determining means, comprising the steps of:

providing an animal at birth with at least one electronic tag, comprising communication means and an identification code;

updating at least one network connected database wirelessly from the at least one tag through the code to at least one receiver connected to the position determining means and a time determining means and in connection with the at least one database, registering time—and positioning information related to the animal;

providing additional information about the animal to the at least one database;

authorizing out of the additional information at least one of slaughtering and distributing actions for the purpose of at least one of meat production, meat product manufacturing and breeding;

scanning and replacing the at least one electronic tag, when the animal is slaughtered, with an additional electronic tag for each piece of meat cut up at the time of slaughter; wherein each additional tag comprises communication means and a code connecting to said at least one database, registering time—and positioning information related to the meat via the at least one receiver; and scanning and removing the additional electronic tags from the cut-up pieces of meat when refining the meat into packaged products and wherein each packaged product subsequently is provided with a replacement tag comprising communication means and a code connecting to the at least one database, registering time—and positioning information related to the meat products via the at least one receiver; and thus having an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning information together with the additional information providing traceability and verifiability of the quality and origin of the animals, meat and meat products.

2. A method according to claim 1, wherein the position of the animal, meat and meat product is determined through position determining means comprised in the at least one tag and each additional and replacement tag.

3. A method according to claim 1, wherein at least one of air and animal meat temperature is measured for the animal, meat and meat product through a temperature determining means comprised in the at least one tag and each additional and replacement tag.

4. A method according to claim 1, wherein the code in each additional tag provided at the time of slaughter is the same code as in the at least one tag provided at birth and refers to the at least one database for additional updating with slaughtering and production-related data.

5. A method according to claim 1, wherein the code in the replacement tag of each packaged product represents and connects to animal data in the at least one database in accordance with mixing of meat from different animals in the product.

6. A method according to claim 1, wherein an end customer gains access to at least part of stored animal data in the at least one database through a local computerized interface and via the code in the replacement tag for self-information of the quality and origin of animals, meat and meat products for sale.

7. A method according to claim 1, wherein the at least one tag is a transponder injected and fastened to a portion of the animal chosen from the group consisting of muscle, skeleton and nape of neck.

8. A method according to claim 1, wherein each replacement tag is a small label fastened to a packaged product.

9. A method according to claim 1, wherein wireless registering of information is accomplished by transmitting data through at least one wireless system chosen from the group consisting of RFID-, bluetooth-, cellular radio technology and wireless local area networks.

10. A method according to claim 1, wherein the position determining means utilizes at least one position determination system chosen from the group consisting of GPS, cellular radio technology and existing geographic databases.

11. A method according to claim 1, wherein a discontinuity in animal time—and positioning data in the at least one database is notified and constitutes a possible hindrance for allowing distributing animals, meat or meat products to a market.

12. A method according to claim 1, wherein animal positioning data in the at least one database is numerically compared with registered positions of alarms chosen from the group consisting of diseases, unauthorized food content and contamination, for notifications in the at least one database constituting possible hindrances for allowing distributing animals, meat and meat products to a market if the positioning data is found matching or close to matching according to a predetermined threshold for the positioning data.

13. A system for controlling and authenticating quality and origin by means of electronic tagging, electronic surveillance and positioning of livestock, meat and meat products via networks for data and telecommunication and position determining means, comprising:
- at least one electronic tag provided to an animal at birth comprising communicating means and an identification code;
- at least one identification code receiver triggering time— and position registrations;
- at least one network connected database being updated wirelessly from the at least one tag through the code via the at least one receiver, registering time—and positioning information related to the animal;
- data inputting means for providing additional information about the animal to the at least one database;
- means for authorizing, out of the additional information, at least one of slaughtering and distributing actions for the purpose of at least one of meat production, meat product manufacturing and breeding;
- tag scanning means for scanning the at least one tag when the animal is slaughtered;
- an additional electronic tag for each piece of meat cut up at the time of slaughter replacing the at least one tag, wherein each additional tag comprises communication means and a code connecting to said at least one database location, registering time—and positioning information related to the meat via the at least one receiver;
- means for scanning the additional tag from each cut-up piece of meat when refining the meat into packaged products; and
- a replacement tag for each packaged product, each replacement tag comprising communication means and a code connecting to the at least one database registering time—and positioning information related to its respective meat product via the at least one receiver; and
- thus having an unbroken chain of time—and positioning information and additional information providing an enhanced means for detecting and avoiding livestock, meat and meat products having been positioned in areas where sickness has been known during an animals lifetime or time as meat or meat product, and the continuity in time and positioning data together with the additional information providing traceability and verifiability of the quality and origin of the animals, meat and meat products.

14. A system according to claim 13, wherein the at least one tag further comprises position determining means.

15. A system according to claim 13, wherein the at least one tag further comprises temperature determining means.

16. A system according to claim 13, wherein each additional tag provided at the time of slaughter is arranged to have the same code as the at least one tag provided to the animal at birth and to refer to the at least one database for additional updating with slaughtering and production-related data.

17. A system according to claim 13, wherein the code in the replacement tag of each packaged product represents and connects to animal data in the at least one database in accordance with mixing of meat from different animals in the product.

18. A system according to claim 13, further including at least one local computerized interface connected to the at least one database wherein the end customer, via the code in the replacement tag, can access at least part of the stored animal data for self-informing of the quality and origin of animals, meat and meat products for sale.

19. A system according to claim 13, wherein the at least one tag is a transponder arranged to be injected and fastened to a portion of the animal chosen from the group consisting of muscle, skeleton and nape of neck.

20. A system according to claim 13, wherein each replacement tag is a small label arranged to be fastened to a packaged product.

21. A system according to claim 13, wherein wireless registering of information is arranged to be accomplished through at least one wireless system chosen from the group consisting of RFID-, bluetooth-, cellular radio technology and wireless local area networks.

22. A system according to claim 13, wherein the position determining means is arranged to utilize at least one position determination system chosen from the group consisting of GPS, cellular radio technology and existing geographic databases.

23. A system according to claim 13, wherein a discontinuity in animal time—and positioning data in the at least one database is notified and arranged to constitute a hindrance for allowing distributing animals, meat and meat products to a market.

24. A system according to claim 13, wherein animal positioning data in the at least one database is arranged to be numerically compared with registered positions of alarms chosen from the group consisting of diseases, unauthorized food content and contamination for notifications in the at least one database constituting possible hindrances for allowing distributing animals, meat and meat products to a market if the positioning data is found matching or close to matching according to a predetermined threshold for the positioning data.

* * * * *